(12) United States Patent
Song et al.

(10) Patent No.: US 11,334,118 B2
(45) Date of Patent: May 17, 2022

(54) FLEXIBLE DISPLAY DEVICE

(71) Applicant: LG ELECTRONICS INC., Seoul (KR)

(72) Inventors: In Su Song, Seoul (KR); Chang Sue Park, Seoul (KR); Insun Lee, Seoul (KR); Minsoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 77 days.

(21) Appl. No.: 17/017,280

(22) Filed: Sep. 10, 2020

(65) Prior Publication Data
US 2021/0405703 A1    Dec. 30, 2021

(30) Foreign Application Priority Data

Jun. 30, 2020    (WO) ................ PCT/KR2020/008517

(51) Int. Cl.
*G06F 1/16* (2006.01)
*G08B 6/00* (2006.01)

(52) U.S. Cl.
CPC ............. *G06F 1/1652* (2013.01); *G08B 6/00* (2013.01)

(58) Field of Classification Search
CPC ..... G06F 1/1652; G06F 1/1626; G06F 1/1624
See application file for complete search history.

(56) References Cited

U.S. PATENT DOCUMENTS

| | | | | |
|---|---|---|---|---|
| 7,059,182 B1 * | 6/2006 | Ragner | ................ | H05K 5/0086 73/200 |
| 8,896,995 B2 * | 11/2014 | Shedletsky | ............. | G06F 3/044 361/679.21 |
| 10,976,775 B1 * | 4/2021 | Cha | ...................... | H04M 1/0268 |
| 2013/0058063 A1 * | 3/2013 | O'Brien | ................ | G06F 1/1652 361/807 |
| 2013/0063885 A1 * | 3/2013 | Shedletsky | .............. | H05K 5/03 361/679.21 |

(Continued)

FOREIGN PATENT DOCUMENTS

| | | |
|---|---|---|
| KR | 1020100079100 | 7/2010 |
| KR | 1020110082943 | 7/2011 |

(Continued)

OTHER PUBLICATIONS

PCT International Application No. PCT/KR2020/008517, International Search Report dated Mar. 16, 2021, 3 pages.

*Primary Examiner* — Hung S. Bui
*Assistant Examiner* — Sagar Shrestha
(74) *Attorney, Agent, or Firm* — Lee, Hong, Degerman, Kang & Waimey PC

(57) ABSTRACT

A flexible display device is disclosed. The flexible display device includes a first body, a second body, a flexible display, an actuator, and a first sensor. The second body reciprocates relative to the first body along a first direction between a first position and a second position. The flexible display includes a first region and a second region. As the second body moves from the first position to the second position, the area of the second region, forming the same plane as the first region, increases. The actuator may be operated such that the second body is moved toward the second position in response to free fall being detected by the first sensor, and damage to the flexible display device due to impact with the ground may thereby be reduced.

20 Claims, 22 Drawing Sheets

(56) References Cited

U.S. PATENT DOCUMENTS

| | | | |
|---|---|---|---|
| 2015/0195926 A1 | 7/2015 | Kandur Raja et al. | |
| 2015/0331456 A1* | 11/2015 | Moon | H04M 1/185 361/51 |
| 2015/0341712 A1* | 11/2015 | Wilcox | H04M 1/04 381/332 |
| 2016/0081204 A1* | 3/2016 | Park | H04M 1/0268 361/807 |
| 2016/0232508 A1* | 8/2016 | Nishiie | G06F 21/32 |
| 2016/0241691 A1* | 8/2016 | Shiga | H04M 1/185 |
| 2017/0045915 A1* | 2/2017 | Pope | G01N 21/41 |
| 2018/0054502 A1* | 2/2018 | Wilson | G06F 1/1633 |
| 2019/0059542 A1* | 2/2019 | Mukherjee | H04B 1/3888 |
| 2019/0165825 A1* | 5/2019 | Lin | H04B 1/3888 |
| 2019/0166235 A1* | 5/2019 | Zeng | H04M 1/026 |
| 2020/0045527 A1* | 2/2020 | Fong | G06F 3/0488 |
| 2020/0253069 A1* | 8/2020 | Cha | G09F 9/301 |
| 2020/0264660 A1* | 8/2020 | Song | G06F 1/1624 |
| 2020/0275560 A1* | 8/2020 | Zeng | G06F 1/1633 |

FOREIGN PATENT DOCUMENTS

| | | |
|---|---|---|
| KR | 1020130113898 | 10/2013 |
| KR | 1020190101605 | 9/2019 |

\* cited by examiner

FLEXIBLE DISPLAY DEVICE

CROSS-REFERENCE TO RELATED APPLICATION

Pursuant to 35 U.S.C. § 119, this application claims the benefit of an earlier filing date and right of priority to International Application No. PCT/KR2020/008517, filed on Jun. 30, 2020, the contents of which are hereby incorporated by reference herein in its entirety.

BACKGROUND

1. Technical Field

The present disclosure relates to a device including a flexible display. More particularly, the present disclosure relates to a device including a flexible display characterized in that the device is portable and is variable in shape.

2. Background

With the development of flexible displays that can be bent while displaying image information thereon, research and development is underway to provide a foldable device by applying a flexible display to a device having two bodies and a folding structure (for example, a hinge unit). In such a foldable device, since the flexible display may be disposed to completely cover the two bodies and the folding structure, a relatively large-sized display can be implemented in the device.

As another device using a flexible display, a rollable device having a structure in which a display is rolled up has been studied and developed. In such a rollable device, as the flexible display is rolled, the total size or area of the display can be reduced. On the contrary, as the flexible display is unrolled, the size or area of the display can be increased.

As still another device using a flexible display, there is a device in which as two bodies slide with respect to each other, a flexible display having a U-shape due to a curved middle portion thereof is deformed such that a surface area of the flexible display seen from one side thereof changes.

Such a flexible display device includes a mobile terminal such as a mobile phone or a smartphone, that can be carried by a user and used in various places.

A user holding the mobile terminal may drop the mobile terminal, or a mobile terminal on a table or the like may accidentally fall to the ground.

The mobile terminal may be damaged due to the impact caused when falling to the ground. As such, there is a need for a method for preventing or mitigating such damage.

SUMMARY

The present disclosure is directed to providing a device characterized in that a curved shape of a flexible display is deformed as two bodies move relative to each other, the device being deformable in shape so as to be capable of reducing an expected impact or damage to the device when the device is in free fall.

The present disclosure is further directed to providing a device characterized in that a curved shape of a flexible display is deformed as two bodies move relative to each other, the device being capable of rotating by deformation thereof when the device is in free fall.

A flexible display device according to an aspect of the present disclosure may be made to be held and carried by a user. That is, the flexible display device may be made to have the same size, shape, and weight as existing mobile terminals.

In some implementations, the flexible display device may include a first body, a second body, a flexible display, an actuator, and a first sensor.

The second body may reciprocate relative to the first body along a first direction between a first position and a second position. The first position may be a relative position of the second body with respect to the first body, and the second position may also be a relative position of the second body with respect to the first body.

When the second body is in the first position relative to the first body, the flexible display device may be in a first state, and when the second body is in the second position relative to the first body, the flexible display device may be in a second state. Accordingly, in the description of the present disclosure, "the first position" may be used in the same sense as "the first state of the flexible display device," and "the second position" may be used in the same sense as "the second state of the flexible display device."

The direction from the first position toward the second position is the first direction.

The second body may include a support.

The support is formed along a second direction, which is a direction orthogonal to the first direction.

The support may be formed in the shape of a roller that is rotatable about a rotational axis of the second direction. That is, the support may be rotatably coupled to the second body.

The flexible display may include a first region and a second region.

The first region may be a region coupled to the first body. The first region may be fixedly coupled to the first body.

The first region may be fixed in front of the first body to face forward. The first region may form a front surface of the flexible display device. The first region may be formed of a plane surface. The first region may be parallel to the first and second directions.

The second region may be a region extending from the first region. A portion of the second region may be curved. A portion of the second region may be curved into a semicircular shape, and as the second body moves, the position of the curved portion in the second region may be changed.

The second region may be curved around the support. A portion of the second region may be curved about a curvature center line, which coincides with the rotational axis of the support, to form a curved surface.

The second region may include a first connected region and a second connected region.

The first connected region may be a region extending from the first region.

The second connected region may be a region extending from the first connected region.

When the second body is in the first position, the first connected region may be curved around the support to form a curved surface, and the second connected region may be parallel to the first region. When the second body is in the first position, the first connected region may be curved around the support to form a curved surface. When the second body is in the first position, the first connected region may form a curved surface of a semicircular shape about the curvature center line.

When the second body is in the second position, the first connected region may form a single plane with the first region, and a portion of the second connected region may form a curved surface while being curved around the support. When the second body is in the second position, a portion of the second connected region may be curved around the support to form a curved surface. When the second body is in the second position, the second connected region may form a curved surface of a semicircular shape about the curvature center line.

The actuator may be configured to provide, to the second body, power for moving the second body.

The actuator may include a driving motor and a driving gear.

The driving motor may be coupled to the first body, and the driving gear may be rotated by the driving motor.

The flexible display device may include a rack.

A gear engaged with the driving gear may be formed in the rack such that the teeth of the gear are successively formed along the first direction. The rack may be integrally formed with the second body, or may be fixedly coupled to the second body.

The first sensor may be coupled to the first body or the second body. The first sensor may be configured to detect free fall of the flexible display device.

The actuator may be configured to operate such that the second body is moved in the first direction (for example, is moved from the first position to the second position) in response to detection of free fall by the first sensor.

The actuator may be configured to operate such that the second body is moved in the opposite direction to the first direction (for example, is moved from the second position to the first position) in response to detection of free fall by the first sensor.

The flexible display device may include a controller and a battery.

The controller may be fixedly coupled to the first body, and may be configured to control the operation of the actuator. The controller may be fixed to the first body through a PCB substrate.

The battery may be fixedly coupled to the first body.

In some implementations, when the second body is moved in the first direction by the actuator (for example, when the second body is moved from the first position to the second position), the center of gravity of the flexible display device may gradually shift to be biased toward the first body and away from the second body.

In some implementations, when the second body is moved in the opposite direction to the first direction by the actuator (for example, when the second body is moved from the second position to the first position), the center of gravity of the flexible display device may gradually shift to be biased toward the first body and away from the second body.

The first body may include a first edge portion forming one edge of the flexible display device.

The first edge portion may be located further outward than the edge of the flexible display.

The second body may include a second edge portion forming an edge of the flexible display device at an opposite side of the flexible display device to the first edge portion. The second edge portion is disposed at an outer side of the support.

When the second body is in the first position, the width between the first edge portion and the second edge portion may be defined as L1, and the distance from the first edge portion to the center of gravity of the flexible display device may be defined as L2.

When the second body is in the second position, the width between the first edge portion and the second edge portion may be defined as L3, and the distance from the first edge portion to the center of gravity of the flexible display device may be defined as L4.

In some implementations, L4/L3 may be smaller than L2/L1.

The first sensor may be configured to detect an inclined direction of the flexible display device.

The controller may be configured to cause the actuator to operate in response to the flexible display device being in free fall while in a first inclined state in which a front side thereof in the first direction is inclined downward.

The flexible display device may further include a vibration generator coupled to the first body.

In the flexible display device, the vibration generator may be configured to operate in response to detection of free fall by the first sensor.

The controller may be configured to cause the vibration generator to operate in response to the flexible display device being in free fall while in the first inclined state.

The vibration generator may include a case and a fixing bracket.

The case forms the exterior of the vibration generator.

The fixing bracket is configured to extend from the case, and two or more fixing brackets may be provided.

The flexible display device may further include a fixing frame and a fixing screw.

The fixing frame may form at least a portion of the first body. The actuator may be fixed to the fixing frame.

The fixing screw is configured to fasten the fixing bracket to the fixing frame.

The flexible display device may further include a plurality of support bars.

The plurality of support bars may be formed to be elongated in a direction orthogonal to the movement direction of the second body, and may be coupled to inner surfaces of the first connected region and the second connected region.

Each of the plurality of the support bars may include a first support slider, a second support slider, and a connection arm.

The first support slider may form one end portion of a support bar.

The second support slider may form the other end portion of the support bar at the opposite side thereof to the first support slider.

The connection arm may connect the first support slider and the second support slider, and may support the inner surfaces of the first connected region and the second connected region.

The second body may include a first movement guide groove and a second movement guide groove.

The first movement guide groove may be formed as a U-shaped groove, and may form a path into which the first support slider is inserted and through which the first support slider moves.

The second movement guide groove may be formed as a U-shaped groove to form a path into which the second support slider is inserted and through which the second support slider moves.

In the flexible display device according to the present disclosure, the actuator may be configured to operate such that the second body is moved to the second position in response to free fall being detected by the first sensor, and accordingly the position of the flexible display device while in free fall can be controlled, and an expected impact or damage to the flexible display device can be reduced.

The flexible display device according to the present disclosure may be configured such that when the second body moves from the first position to the second position, the center of gravity of the flexible display device may gradually shift to be biased toward the first body and away from the second body, and at this time, in response to free fall being detected by the first sensor, the actuator may be operated to move the second body to the second position. Accordingly, the flexible display device can be rotated while in free fall, and the portion thereof that is not deformed (for example, the first edge portion and its surroundings), rather than the portion thereof that is deformed (for example, the second edge portion and its surroundings), can be made to contact the floor first.

In the flexible display device according to the present disclosure, the vibration generator includes a fixing bracket, and may be fixed to the fixing frame by a fixing screw. Accordingly, vibration of the vibration generator can be effectively transmitted to the flexible display device, and the amount of position control of the flexible display device can be increased.

In the flexible display device according to the present disclosure, in response to free fall being detected by the first sensor, movement of the second body (moving from the first position to the second position) and operation of the vibration generator may be performed together. Accordingly, the amplitude of the vibration of the flexible display device and the amount of posture control of the flexible display device can be increased.

BRIEF DESCRIPTION OF THE DRAWINGS

The foregoing and other aspects, features, and advantages of the invention, as well as the following detailed description of the embodiments, will be better understood when read in conjunction with the accompanying drawings. For the purpose of illustrating the present disclosure, there is shown in the drawings an exemplary embodiment, it being understood, however, that the present disclosure is not intended to be limited to the details shown because various modifications and structural changes may be made therein without departing from the spirit of the present disclosure and within the scope and range of equivalents of the claims. The use of the same reference numerals or symbols in different drawings indicates similar or identical items.

FIG. 4 is an exploded perspective view of the flexible display device of FIG. 2a.

FIG. 6a is a cross-sectional view taken along line A-A' of FIG. 2a.

FIG. 11a is a cross-sectional view taken along line B-B' of FIG. 2a.

DETAILED DESCRIPTION

Figure 1:
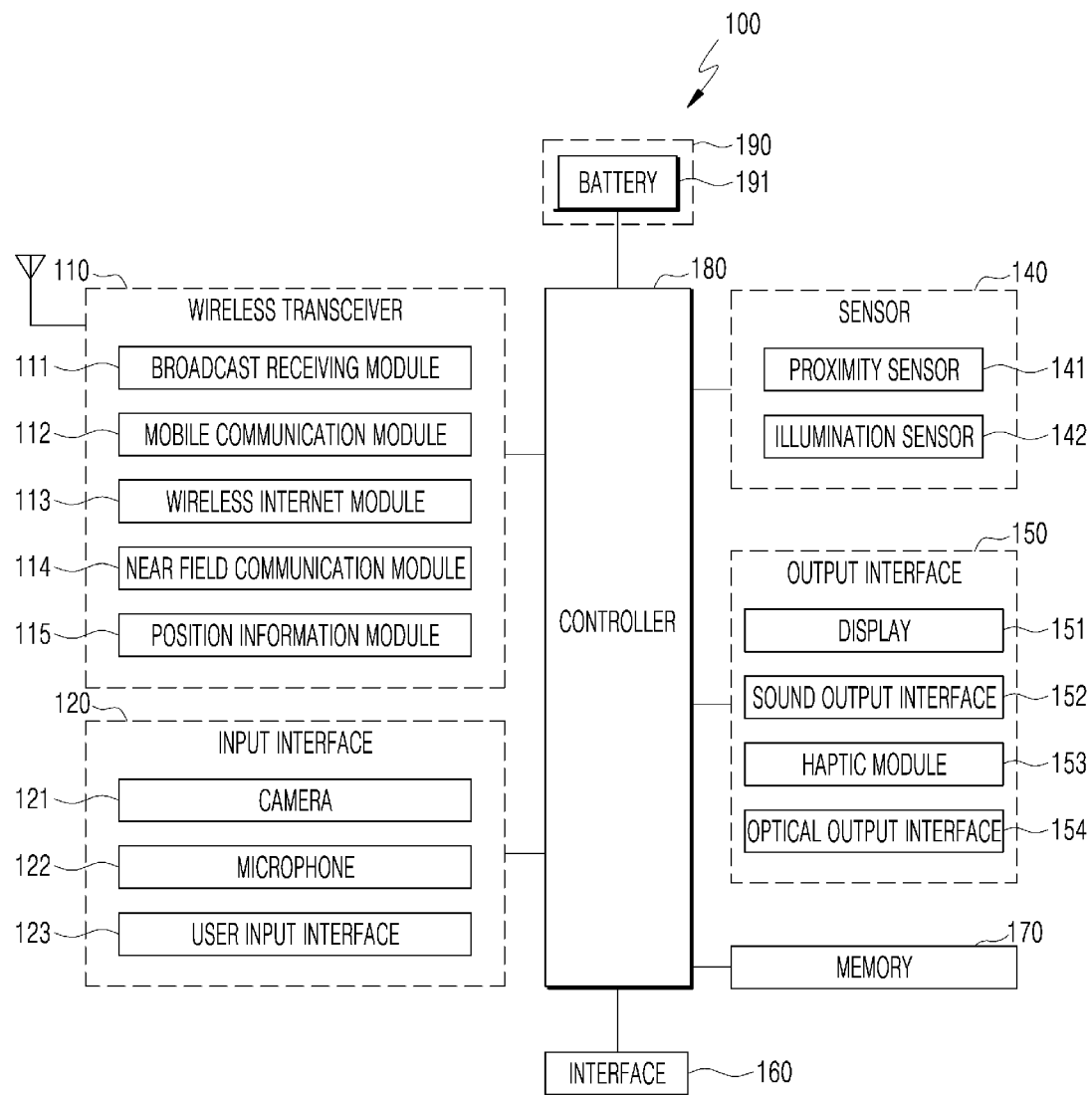
FIG. 1 is a block diagram for explaining a flexible display device.

Hereinafter, exemplary embodiments disclosed herein will be described in detail with reference to the accompanying drawings. Like reference numerals designate like elements, and redundant description thereof will be omitted. Suffixes "module" and "unit" or "portion" or "part" for elements used in the following description are merely provided for facilitation of preparing this specification, and thus they are not granted a specific meaning or function. In the following description, when it is considered that known functions or structures may confuse the gist of the embodiments of the present disclosure, the known functions or structures are not explained. The accompanying drawings are used to help easily explain various technical features and it should be understood that the embodiments presented herein are not limited by the accompanying drawings. As such, the present disclosure should be construed to extend to any alterations, equivalents and substitutes in addition to those which are particularly set out in the accompanying drawings.

The shapes, sizes, ratios, angles, the number of elements given in the drawings are merely exemplary, and thus, the present disclosure is not limited to the illustrated details. Like reference numerals designate like elements throughout the specification.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present.

As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

A flexible display device (also referred to as a 'display device') described in the present specification may include a mobile terminal such as a portable phone, a smartphone, a laptop computer, a digital broadcast terminal, a personal digital assistant (PDA), a portable multimedia player (PMP), a navigation, a slate PC, a tablet PC, an ultra-book, a wearable device, a smart watch, a smart glass, a head mounted display (HMD), and the like.

It will be apparent to those skilled in the art that the configuration according to the embodiments disclosed in the present specification may be applied to fixed terminals such as a digital TV, a desktop computer, a digital signage, and the like, except for when the configuration is applied only to a mobile terminal. Hereinafter, in the present disclosure, for the convenience of description, the mobile terminal will be first described as an example of the flexible display device.

FIG. 1 is a block diagram for explaining a mobile terminal 100 related to the present disclosure.

The mobile terminal 100 may include a wireless transceiver 110, an input interface 120, a sensor 140, an output interface 150, an interface 160, a memory 170, a controller 180, and a power supply 190. The elements shown in FIG. 1 are not essential to implement the mobile terminal, and the mobile terminal described in this specification may include more or fewer elements than the above-enumerated elements.

More specifically, the wireless transceiver 110 may include one or more modules that enable wireless communications between the mobile terminal 100 and a wireless communication system, between the mobile terminal 100 and another mobile terminal 100, or between the mobile terminal 100 and an external server. Further, the wireless transceiver 110 may include one or more modules connecting the mobile terminal 100 to one or more networks.

The wireless transceiver 110 may include at least one of a broadcast receiving module 111, a mobile communication module 112, a wireless internet module 113, a near field communication module 114, or a position information module 115.

The input interface 120 may include a camera 121 or a video input interface, which are configured to receive input of a video signal, a microphone 122 or an audio input interface, which are configured to receive input of an audio signal, and a user input interface 123 (for example, a touch key or a mechanical key), which is configured to receive an input of information from a user. Voice data or image data collected by the input interface 120 may be analyzed and processed as a control command of the user.

The sensor 140 may include one or more sensors configured to sense at least one piece of information among information in the mobile terminal, surrounding environment information of the mobile terminal, or user information. For example, the sensor 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, a camera 121), a microphone 122, a battery gauge, an environment sensor (for example, a barometer, a hygrometer, a thermometer, a radiation sensor, a thermal sensor, a gas sensor, etc.), and a chemical sensor (for example, an electronic nose, a healthcare sensor, or a biometric sensor). Further, the mobile terminal disclosed in the present specification may combine information sensed by at least two sensors from the above-mentioned sensors and may use the combined information.

The output interface 150 may be for generating outputs related to visual, auditory, or tactile senses, and may include at least one of a display 151, a sound output interface 152, a haptic module 153, or an optical output interface 154. The display 151 may form a mutual layer structure with a touch sensor or may be formed integrally with a touch sensor, to be implemented as a touch screen. The touch screen may serve as a user input interface 123 configured to provide an input interface between the mobile terminal 100 and the user, and at the same time, may provide an output interface between the mobile terminal 100 and the user.

The interface 160 may serve as a passage between the mobile terminal 100 and various types of external devices connected to the mobile terminal 100. The interface 160 may include at least one of a wired/wireless headset port, an external charger port, a wired/wireless data port, a memory card port, a port for connecting a device equipped with an identification module, an audio input/output (I/O) port, a video input/output (I/O) port, or an earphone port. In response to a connection between an external device and the interface 160, the mobile terminal 100 may perform an appropriate control regarding the connected external device.

Further, the memory 170 may store therein data supporting various functions of the mobile terminal 100. The memory 170 may store therein a plurality of application programs (or applications) driven in the mobile terminal 100, data for operations of the mobile terminal 100, and commands. At least some of the application programs may be downloaded from an external server through wireless communication. Further, for the basic functions of the mobile terminal 100 (for example, functions for receiving and making calls and receiving and sending messages), at least some of the application programs may be provided in the mobile terminal 100 from the time of manufacture. The application programs may be stored in the memory 170 and installed on the mobile terminal 100 so as to be driven by the controller 180 to perform operations (or functions) of the mobile terminal 100.

In addition to the operations related to the application programs, the controller 180 may generally control overall operation of the mobile terminal 100. The controller 180 may process a signal, data, or information that is inputted or outputted through the above-described elements or drive the application programs stored in the memory 170 to thereby provide appropriate information or functions to the user or process them.

Further, in order to drive the application programs stored in the memory 170, the controller 180 may control at least one of the elements described with reference to FIG. 1. Moreover, the controller 180 may combine and operate at least two of the elements included in the mobile terminal 100 to drive the application programs.

Under the control of the controller 180, the power supply 190 may be supplied with external power or internal power, and supply power to each element included in the mobile terminal 100. The power supply 190 may include a battery, and the battery may be an internal battery or a replaceable battery.

At least some of the above-described elements may operate in cooperation with each other to implement the operation or control of the mobile terminal or the control method of the mobile terminal according to various embodiments which will be described below. Further, the operation or control of the mobile terminal or the control method of the mobile terminal may be implemented on the mobile terminal by driving at least one application program stored in the memory 170.

Hereinafter, prior to describing various embodiments implemented by the mobile terminal 100 described above, the above-mentioned elements will be described in more detail with reference to FIG. 1.

The broadcast receiving module 111 of the wireless transceiver 110 may receive a broadcast signal and/or broadcast-related information from an external broadcast management server through a broadcast channel. The broadcast channel may include a satellite channel and a ground wave channel. The mobile terminal 100 may be provided with two or more broadcast receiving modules for simultaneous reception of at least two broadcast channels or for broadcast channel switching.

The broadcast management server may refer to a server that generates and transmits a broadcast signal and/or broadcast-related information, or a server that is supplied with a previously generated broadcast signal and/or broadcast-related information and transmits the supplied broadcast signal and/or broadcast-related information to the mobile terminal 100. The broadcast signal may include not only a TV broadcast signal, a radio broadcast signal, and a data broadcast signal, but also a broadcast signal obtained by combining a TV broadcast signal or a radio broadcast signal with a data broadcast signal.

The broadcast signal may be encoded according to at least one of technical standards for transmission and reception of a digital broadcast signal (or broadcast schemes, such as ISO, IEC, DVB, or ATSC), and the broadcast receiving module 111 may receive the digital broadcast signal by using an appropriate method meeting the technical specification determined by the technical standards.

The broadcast-related information may refer to information related to a broadcast channel, a broadcast program, or a broadcast service provider. The broadcasting-related information may also be provided through the mobile communication network. Here, the broadcasting-related information may be received by the mobile communication module 112.

The broadcast-related information may exist in various forms, such as an electronic program guide of digital multimedia broadcasting (DMB) or an electronic service guide of a digital video broadcast-handheld (DVB-H). The broadcast signal and/or the broadcast-related information received through the broadcast receiving module 111 may be stored in the memory 170.

The mobile communication module 112 may transmit/receive a wireless signal to/from at least one of a base station, an external terminal, or a server on a mobile communication network established according to the technical standards for mobile communications or communication methods (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless signal may include a voice call signal, a video call signal, or various forms of data for transmission or reception of a text/multimedia message.

The wireless internet module 113 may refer to a module for wireless Internet connection, and may be installed in the mobile terminal 100 or installed outside the mobile terminal 100. The wireless internet module 113 may be configured to transmit and receive a wireless signal over a communication network according to wireless Internet technologies.

Wireless Internet technologies may include, for example, wireless LAN (WLAN), wireless fidelity (Wi-Fi), Wi-Fi direct, Digital Living Network Alliance (DLNA), wireless broadband (WiBro), Worldwide Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A). The wireless internet module 113 may transmit and receive data in accordance with at least one wireless Internet technology from among the above-mentioned wireless Internet technologies and wireless Internet technologies that were not described above.

From the viewpoint that the wireless internet connection through, for example, WiBro, HSDPA, HSUPA, GSM, CDMA, WCDMA, LTE, and LTE-A is made through the mobile communication network, the wireless internet module 113, which performs the wireless Internet connection through the mobile communication network, may be understood as one type of the mobile communication module 112.

The near field communication module 114 may be for short-range communications, and may support short-range communications by using at least one of Bluetooth™, radio frequency identification (RFID), infrared data association (IrDA), ultra wideband (UWB), ZigBee, Short-range Communication (NFC), wireless fidelity (Wi-Fi), Wi-Fi Direct, or Wireless Universal Serial Bus (Wireless USB). The near field communication module 114 may support wireless communications, over a near-field wireless communication network, between the mobile terminal 100 and the wireless communication system, between the mobile terminal 100 and another mobile terminal 100, or between the mobile terminal 100 and a network in which another mobile terminal 100 (or external server) is located. The near-field wireless communication network may be a wireless personal area network.

Here, the another mobile terminal 100 may be a wearable device (for example, a smart watch, a smart glass, or a head mounted display (HMD)) capable of exchanging data (or interworking) with the mobile terminal 100 according to the present disclosure. The near field communication module 114 may sense (or recognize) the presence of a wearable device that is capable of communicating with the mobile terminal 100, in the vicinity of the mobile terminal 100. Moreover, when the detected wearable device is a device that has been authenticated to communicate with the mobile terminal 100 according to the present disclosure, the controller 180 may transmit at least a portion of data processed in the mobile terminal 100 to the wearable device through the near field communication module 114. Therefore, the user of the wearable device may use, through the wearable device, the data that have been processed in the mobile terminal 100. For example, according to this, when a phone call is received by the mobile terminal 100, the user may receive the phone call through the wearable device, or when a message is received by the mobile terminal 100, the user may check the received message through the wearable device.

The position information module 115 may be a module for obtaining a position (or a current position) of a mobile terminal, and its representative examples may include a global positioning system (GPS) module or a wireless fidelity (Wi-Fi) module. For example, when a GPS module is utilized, the mobile terminal may obtain the position of the mobile terminal by using a signal transmitted from a GPS satellite. As another example, when a Wi-Fi module is utilized, the mobile terminal may obtain the position of the mobile terminal on the basis of information on a wireless access point (AP) which transmits and receives wireless signals to and from the Wi-Fi module. If necessary, the position information module 115 may alternatively or additionally perform a function of another module of the wireless transceiver 110 to obtain data on the position of the mobile terminal. The position information module 115 may be a module used to obtain the position (or the current position) of the mobile terminal, and is not limited to a module that directly calculates or obtains the position of the mobile terminal.

Next, the input interface 120 may be for receiving input of video information (or signal), audio information (or signal), data, or information inputted by the user. For receiving input of the video information, the mobile terminal 100 may include a camera 121 or a plurality of cameras 121. The camera 121 may process an image frame such as a still image or a moving image obtained by an image sensor in a video call mode or a photographing mode. The processed image frame may be displayed on the display 151 or stored in the memory 170. Further, the plurality of cameras 121 provided in the mobile terminal 100 may be arranged to form a matrix structure, and a plurality of pieces of image information having various angles or focal points may be inputted to the mobile terminal 100 through the plurality of cameras 121 forming the matrix structure. In addition, the plurality of cameras 121 may be arranged to form a stereo structure to obtain left and right images used to implement a stereoscopic image.

The microphone 122 may process an external sound signal into electric voice data. The processed voice data may be utilized in various manners in accordance with the function that is being performed in the mobile terminal 100 (or in accordance with an application program that is being executed). Various noise removal algorithms for removing noise generated during the process of receiving the external sound signal may be implemented in the microphone 122.

The user input interface 123 may be for receiving information from the user, and when information is inputted through the user input interface 123, the controller 180 may control operation of the mobile terminal 100 so as to correspond to the inputted information. The user input interface 123 may include a mechanical input interface (or a mechanical key, such as a button located on a front, rear, or side surface of the mobile terminal 100, a dome switch, a jog wheel, a jog switch, etc.) and a touch type input interface. For example, the touch type input interface may be formed as a virtual key, a soft key, or a visual key displayed on a touch screen through a software process, or as a touch key disposed in a part other than the touch screen. The virtual key or the visual key may be displayed on the touch screen in various shapes, and may include, for example, graphics, text, icons, video, or a combination thereof.

The sensor 140 may sense at least one of information in the mobile terminal, information of the surrounding environment of the mobile terminal, or user information, and generate a sensing signal corresponding to sensed information. On the basis of the sensing signal, the controller 180 may control the driving or operation of the mobile terminal 100 or perform data processing, functions, or operations related to an application program installed in the mobile terminal 100. Representative sensors among various sensors that can be included in the sensor 140 will now be described in more detail.

First, the proximity sensor 141 may be a sensor which senses the presence of an object that is approaching a predetermined sensing surface or of nearby objects, by using the force of an electromagnetic field or infrared ray without any mechanical contact. The proximity sensor 141 may be disposed in an internal area of the mobile terminal 100, which is enclosed by the above-described touch screen, or may be disposed in the vicinity of the touch screen.

Examples of the proximity sensor 141 may include a transmission type photoelectric sensor, a direct reflection type photoelectric sensor, a mirror reflection type photoelectric sensor, a high frequency oscillation type proximity sensor, a capacitive proximity sensor, a magnetic proximity sensor, and an infrared proximity sensor. When the touch screen is a capacitive type, the proximity sensor 141 may be configured to detect proximity of an object by sensing a change in the electric field caused by an approaching object having conductivity. Here, the touch screen (or the touch sensor) itself may be classified as a proximity sensor.

For convenience of description, when an object approaches the touch screen without contacting the touch screen, and it is recognized that the object is located above the touch screen, it is referred to as a "proximity touch." When the object actually touches the touch screen, it is referred to as a "contact touch." A position at which the object proximately touches the touch screen may be a position at which the object vertically corresponds to the touch screen when the object proximately touches the touch screen. The proximity sensor 141 may sense a proximity touch and a proximity touch pattern (for example, a proximity touch distance, a proximity touch direction, a proximity touch speed, a proximity touch time, a proximity touch position, a proximity touch movement state, etc.). As described above, the controller 180 may process data (or information) corresponding to a proximate touch operation and a proximate touch pattern sensed by the proximity sensor 141, and may output visual information corresponding to the processed data on the touch screen. Furthermore, the controller 180 may control the mobile terminal 100 to process different operations or data (or information) depending on whether the touch on the same point on the touch screen is the proximity touch or the contact touch.

The touch sensor may sense a touch (or a touch input) applied to the touch screen (or the display 151) by using at least one of various touch types, such as a resistive film type, a capacitive type, an infrared type, an ultrasonic type, and a magnetic field type.

For example, the touch sensor may be configured to convert a change in pressure that is applied to a specific portion of the touch screen, or a change in capacitance that is generated in a specific portion of the touch screen, into an electrical input signal. The touch sensor may be configured to detect a position where a touch subject which applies a touch onto the touch screen is touched on the touch sensor, the surface area of the touch, the pressure of the touch, and the capacitance at the time of the touch. Here, the touch subject may be an object that applies a touch to the touch sensor, and may include, for example, a finger, a touch pen, a stylus pen, and a pointer.

As described above, when there is a touch input to the touch sensor, a signal or signals corresponding to the touch input may be transmitted to a touch controller. The touch controller may process the signal(s) and then transmit corresponding data to the controller 180. Then, the controller 180 may confirm which area of the display 151 was touched. Here, the touch controller may be a separate element from the controller 180, or may be the controller 180 itself.

The controller 180 may perform a different control or the same control depending on a type of a touch subject touching the touch screen (or a touch key provided other than the touch screen). Whether to perform a different control or the same control depending on the type of touch subject may be determined in accordance with a current operating state of the mobile terminal 100 or an application program that is being executed.

The touch sensor and the proximity sensor described above may, independently or in combination, sense various types of touches on the touch screen, such as a short (or tap) touch, a long touch, a multi touch, a drag touch, a flick touch, a pinch-in touch, a pinch-out touch, a swipe touch, or a hovering touch.

The ultrasonic sensor may recognize position information of a sensing object by using an ultrasonic wave. The controller 180 may be able to calculate a position of a wave generating source from information sensed by an optical sensor and a plurality of ultrasonic sensors. The position of the wave generating source may be calculated by using the property of light that light is much faster than an ultrasonic wave, that is, the time in which light reaches the optical sensor is much shorter than the time in which the ultrasonic wave reaches the ultrasonic sensor. More specifically, the position of the wave generating source may be calculated by using the difference between the arrival time of the ultrasonic wave and the arrival time of the light, with the light as a reference signal.

As an element of the input interface 120, the camera 121 may include at least one of a camera sensor (for example, a CCD or a CMOS), a photo sensor (or an image sensor), or a laser sensor.

The camera 121 and the laser sensor may be combined to sense a touch of a sensing object for a three-dimensional stereoscopic image. The photo sensor may be stacked on a display element and may be configured to scan a motion of the sensing object proximate to the touch screen. More specifically, the photo sensor may be formed by mounting a photo diode and a transistor (TR) in rows/columns to scan an object on the photo sensor by using an electrical signal which changes in accordance with the amount of light applied to the photo diode. That is, the photo sensor may calculate coordinates of a sensing object in accordance with a change in the amount of light, to thereby obtain position information of the sensing object.

The display 151 may display (output) information processed in the mobile terminal 100. For example, the display 151 may display execution screen information of an application program driven in the mobile terminal 100, or user interface (UI) and graphic user interface (GUI) information in accordance with the execution screen information.

Further, the display 151 may be configured as a stereoscopic display which displays a stereoscopic video.

A three-dimensional display type, such as a stereoscopic type (a glasses type), an autostereoscopic type (a glasses-free type), and a projection type (a holographic type), may be applied to the stereoscopic display.

The sound output interface 152 may output audio data received from the wireless transceiver 110 in, for example, a call signal reception mode, a phone-call mode, a recording mode, a voice recognition mode, and a broadcast reception mode, or audio data stored in the memory 170. The sound output interface 152 may also output a sound signal (for example, a call signal reception sound and a message reception sound) related to a function performed in the mobile terminal 100. The sound output interface 152 may include, for example, a receiver, a speaker, and a buzzer.

The haptic module 153 may generate various tactile effects the user can feel. A representative example of the tactile effect generated by the haptic module 153 may be vibration. An intensity and a pattern of the vibration generated in the haptic module 153 may be controlled by the user or a setting of the controller 180. For example, the haptic module 153 may synthesize vibrations different from one another to output the synthesized vibrations, or sequentially output the different vibrations.

In addition to vibration, the haptic module 153 may generate various tactile effects, such as effects by a pin arrangement which vertically moves to a contact skin surface, an injection force or a suction force of air through an injection port or a suction port, grazing on a skin surface, electrode contact, or stimulation of an electrostatic force or effects of reproducing a cold or hot sensation using a heat absorbing or heat emitting element.

The haptic module 153 may not only transmit a tactile effect through direct contact, but may also be implemented to allow the user to feel a tactile effect through muscular sensation of a finger or an arm. Two or more haptic modules 153 may be provided depending on the configuration of the mobile terminal 100.

The optical output interface 154 may output a signal for providing notification of occurrence of an event by using light of a light source of the mobile terminal 100. Examples of the events generated in the mobile terminal 100 may include, for example, message reception, call signal reception, missed call, alarm, schedule notification, email reception, and information reception through an application.

The signal outputted from the optical output interface 154 may be implemented as the mobile terminal 100 emits light of a single color or a plurality of colors to a front surface or a rear surface thereof. The output of the signal may end as the mobile terminal 100 senses confirmation of the event by the user.

The interface 160 may serve as a passage to all external devices that are connected to the mobile terminal 100. The interface 160 may receive data from an external device or may be supplied with the power source and transmit the supplied power source to each element in the mobile terminal 100, or may transmit data in the mobile terminal 100 to an external device. The interface 160 may include, for example, a wired/wireless headset port, an external charger port, a wired/wireless data port, a memory card port, a port for connecting a device equipped with an identification module, an audio input/output (I/O) port, a video input/output (I/O) port, and an earphone port.

The identification module may be a chip in which various information for authenticating a user right of the mobile terminal 100 is stored, and may include a user identification module (UIM), a subscriber identification module (SIM), and a universal subscriber identity module (USIM). A device provided with an identification module (hereinafter, "identification device") may be manufactured in the form of a smart card. Therefore, the identification device may be connected to the mobile terminal 100 through the interface 160.

When the mobile terminal 100 is connected to an external cradle, the interface 160 may serve as a passage through which power is supplied from the cradle to the mobile terminal 100 or a passage through which various command signals inputted to the cradle by a user are transmitted to the mobile terminal 100. Various command signals inputted from the cradle or the power source may serve as a signal for recognizing that the mobile terminal 100 has been precisely mounted in the cradle.

The memory 170 may store a program for operation of the controller 180, or temporarily store inputted/outputted data (for example, a phone book, a message, a still image, and a moving image). The memory 170 may store data on various patterns of vibration or sound outputted when a touch is inputted onto the touch screen.

The memory 170 may include at least one type of storage medium from among a flash memory type, a hard disk type, a solid state disk (SSD) type, a silicon disk drive (SDD) type, a multimedia card micro type, and card type memories (for example, SD or XD memory and the like), a random access memory (RAM), a static random access memory (SRAM), a read only memory (ROM), an electrically erasable programmable read only memory (EEPROM), a programmable read only memory (PROM), a magnetic memory, a magnetic disk, and an optical disk. The mobile terminal 100 may operate in association with a web storage which performs a storage function of the memory 170 on the Internet.

As described above, the controller 180 may control an operation related to application programs and overall operation of the mobile terminal 100. For example, when the state of the mobile terminal 100 satisfies a predetermined condition, the controller 180 may perform a locking function which limits input of a control command of a user for applications or may release the locking function.

Further, the controller 180 may perform control and processing related to voice call, data communication, and video call, or perform a pattern recognition process by which a handwriting input or a picture drawing input performed on the touch screen may be recognized as a text or an image, respectively. Moreover, the controller 180 may control any one element or a combination of a plurality of the elements described above, to implement various embodiments of the mobile terminal 100 according to the present disclosure which will now be described below.

Under the control of the controller 180, the power supply 190 may be supplied with an external power or an internal power and may supply power required for operating each element. The power supply 190 may include a battery, wherein the battery may be an embedded rechargeable battery or may be detachably coupled to a body of the mobile terminal 100 to be charged.

Further, the power supply 190 may be provided with a connection port, and the connection port may be configured as one example of the interface 160 to which an external charger that supplies power for charging the battery is electrically connected.

As another example, the power supply 190 may be configured to wirelessly charge the battery without using the connection port. Here, the power supply 190 may receive power from an external wireless power transmission device by using one or more of an inductive coupling scheme based on a magnetic induction phenomenon or a magnetic resonance coupling scheme based on an electromagnetic resonance phenomenon.

Various embodiments that will now be described below may be implemented in a recording medium which can be read by a computer or a device similar thereto by using software, hardware, or a combination thereof, for example.

The display 151 may display (output) information processed in the mobile terminal 100. For example, the display 151 may display execution screen information of an application program driven in the mobile terminal 100, or user interface (UI) and graphic user interface (GUI) information in accordance with the execution screen information.

The display 151 may include at least one of a liquid crystal display (LCD), a thin film transistor liquid crystal display (TFT LCD), an organic light emitting diode (OLED), a flexible display, a three-dimensional display (3D display), or an electronic ink display (e-ink display).

Further, the display 151 may be two or more displays 151 depending on the implementation of the mobile terminal 100. Here, a plurality of displays 151 may be disposed to be spaced apart from each other or disposed integrally on one surface of the mobile terminal 100, or each of the plurality of displays 151 may be disposed on different surfaces of the mobile terminal 100.

The display 151 may include a touch sensor which senses a touch on the display 151 so as to receive input of a control command in the touch method. When a touch is made on the display 151, the touch sensor may sense the touch, and on the basis of the sensed touch, the controller 180 may generate a control command corresponding to the sensed touch. Contents inputted through the touch method may include letters, numbers, instructions in various modes, and menu items.

The microphone 122 may be configured to receive voice of the user and other sounds. The microphone 122 may be provided in a plurality of positions so as to receive stereo sounds.

The interface 160 may serve as a passage connecting the mobile terminal 100 to external devices. For example, the interface 160 may be at least one of a connection terminal for connection with other devices (for example, an earphone or an external speaker), a port for short-range communications (for example, an infrared port (IrDA port), a Bluetooth port, a wireless LAN port, etc.), or a power supply terminal for supplying power to the mobile terminal 100. The interface 160 may be implemented in the form of a socket accommodating an external card, such as a subscriber identification module (SIM), a user identity module (UIM), and a memory card for storing information.

At least one antenna for wireless communications may be provided in the body of the mobile terminal 100. The antenna may be embedded in the body of the mobile terminal 100 or may be formed in a case. For example, an antenna that forms a part of the broadcast receiving module 111 (see FIG. 1) may be implemented so as to be drawable from the body of the mobile terminal 100. Alternatively, the antenna may be formed as a film type to be attached to an inner surface of a housing, or a case including a conductive material may serve as an antenna.

The power supply 190 (see FIG. 1) for supplying power to the mobile terminal 100 may be provided in the body of the mobile terminal 100. The power supply 190 may be embedded in the body of the mobile terminal 100, or may include a battery 191 outside the body of the mobile terminal 100, the battery 191 being detachable.

The battery 191 may be configured to be supplied with power through a power cable connected to the interface 160. Further, the battery 191 may be configured to be wirelessly charged by a wireless charging device. The wireless charging may be implemented by a magnetic induction scheme or a resonance scheme (magnetic resonance scheme).

An accessory that protects an exterior of the mobile terminal 100 or supports or extends a function thereof may be added to the mobile terminal 100. An example of the accessory may be a cover that covers at least one surface of the mobile terminal 100 or a pouch accommodating the mobile terminal 100. The cover or the pouch, in conjunction with the display 151, may extend the function of the mobile terminal 100. Another example of the accessory may be a touch pen which supports or extends a touch input on the touch screen.

The flexible display device 1 according to the embodiment of the present disclosure may include a flexible display 300 which is configured to be deformed by an external force.

The deformation may be at least one of warping, bending, folding, twisting, rolling, or spreading of a display module. Such a deformable display module may be referred to as a "flexible display." Here, the flexible display 300 may include a general flexible display, an electronic paper (e-paper), and a combination thereof.

A general flexible display refers to a durable display which, while still having characteristics of existing flat panel displays, is produced on a thin and flexible substrate which can be warped, bent, folded, twisted, rolled, and spread like paper, so as to be light in weight and not to be easily broken.

Further, electronic paper is a display technique to which characteristics of general ink are applied. Electronic paper may be different from existing flat panel displays in that electronic paper uses reflection light. Electronic paper may change information thereon by using a twist ball or electrophoresis using a capsule.

Information displayed on the flexible display 300 may include visual information outputted on a curved surface. The visual information may be implemented as the light emission of unit pixels (sub pixels) that are arranged in a matrix form is independently controlled. The unit pixel refers to a minimum unit for implementing one color.

A portion of the flexible display 300 may be in a bent state, not in a flat state. Here, when an external force is applied to the flexible display 300, a portion of the flexible display 300 may be deformed into a flat state, a less bent state, or a more bent state.

The flexible display 300 may be combined with a touch sensor to implement a flexible touch screen. When a touch input is made on the flexible touch screen, the controller 180 (see FIG. 1) may perform control corresponding to the touch input. The flexible touch screen may be configured to sense a touch input while a portion of the flexible display 300 is in the flat state or in the bent state.

A flexible display device 1 according to the example in which the flexible display 300 is deformable may include a deformation sensor capable of sensing deformation in the flexible display 300. The deformation sensor may be included in the sensor 140 (see FIG. 1).

The deformation sensor may be provided in the flexible display 300 or in a body 200, and may sense information related to deformation of the flexible display 300. Here, the information related to the deformation may include information on a direction in which the flexible display 300 is deformed, information on a degree of the deformation of the flexible display 300, information on a position of the deformation in the flexible display 300, information on a time of the deformation, and information on an acceleration at which the deformed flexible display 300 is recovered. In addition to the above information, various other types of information that can be sensed as the flexible display 300 is bent may also be included.

Further, the controller 180 (see FIG. 1) may change information displayed on the flexible display 300 or generate a control signal for controlling a function of the flexible display device 1, on the basis of the information related to the deformation of the flexible display 300 sensed by the deformation sensor.

The deformation of the flexible display 300 may not be limited to the deformation caused by an external force. For example, when the flexible display 300 is in a state in which a portion thereof is spread, the portion may be deformed to be bent by a command of the user or an application.

Figure 2A:
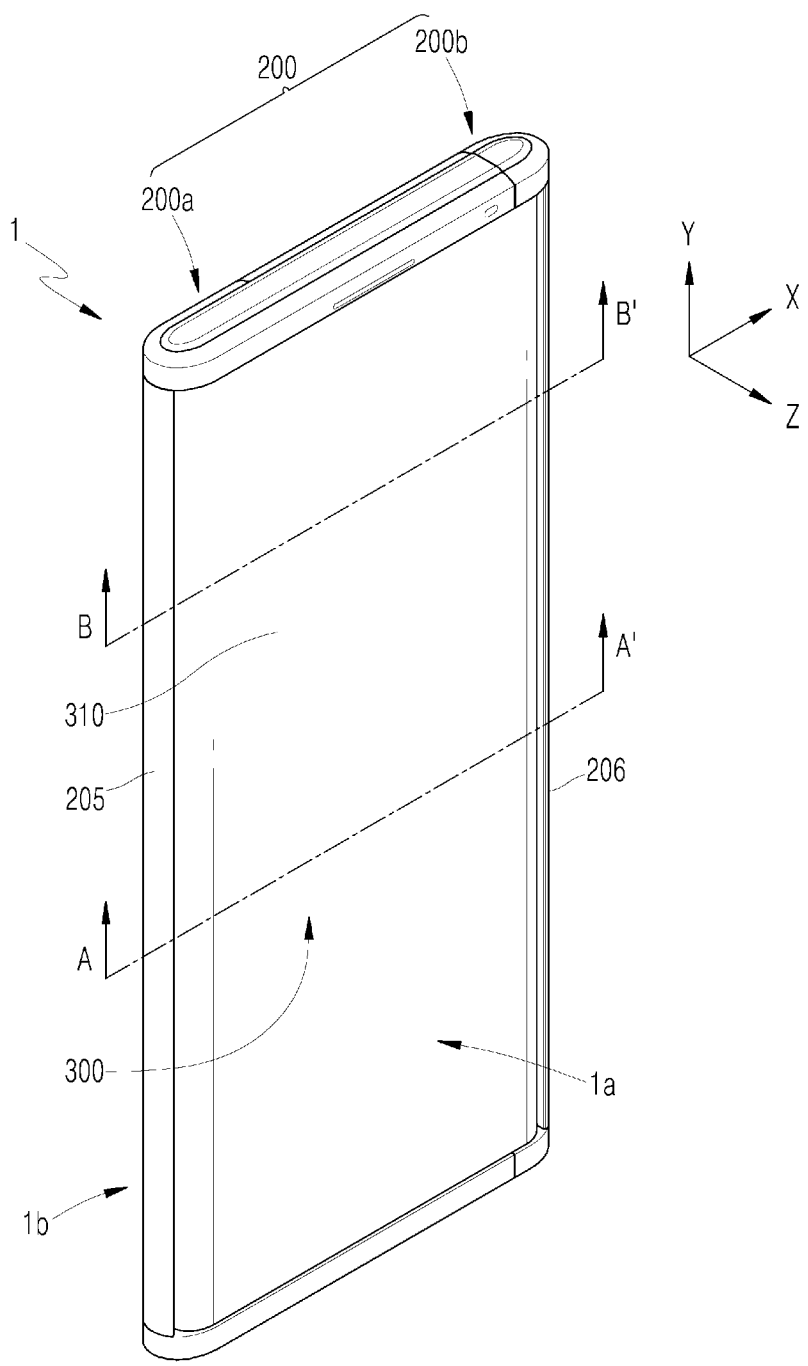
FIG. 2a is a perspective view of a flexible display in a first state.
Figure 2B:
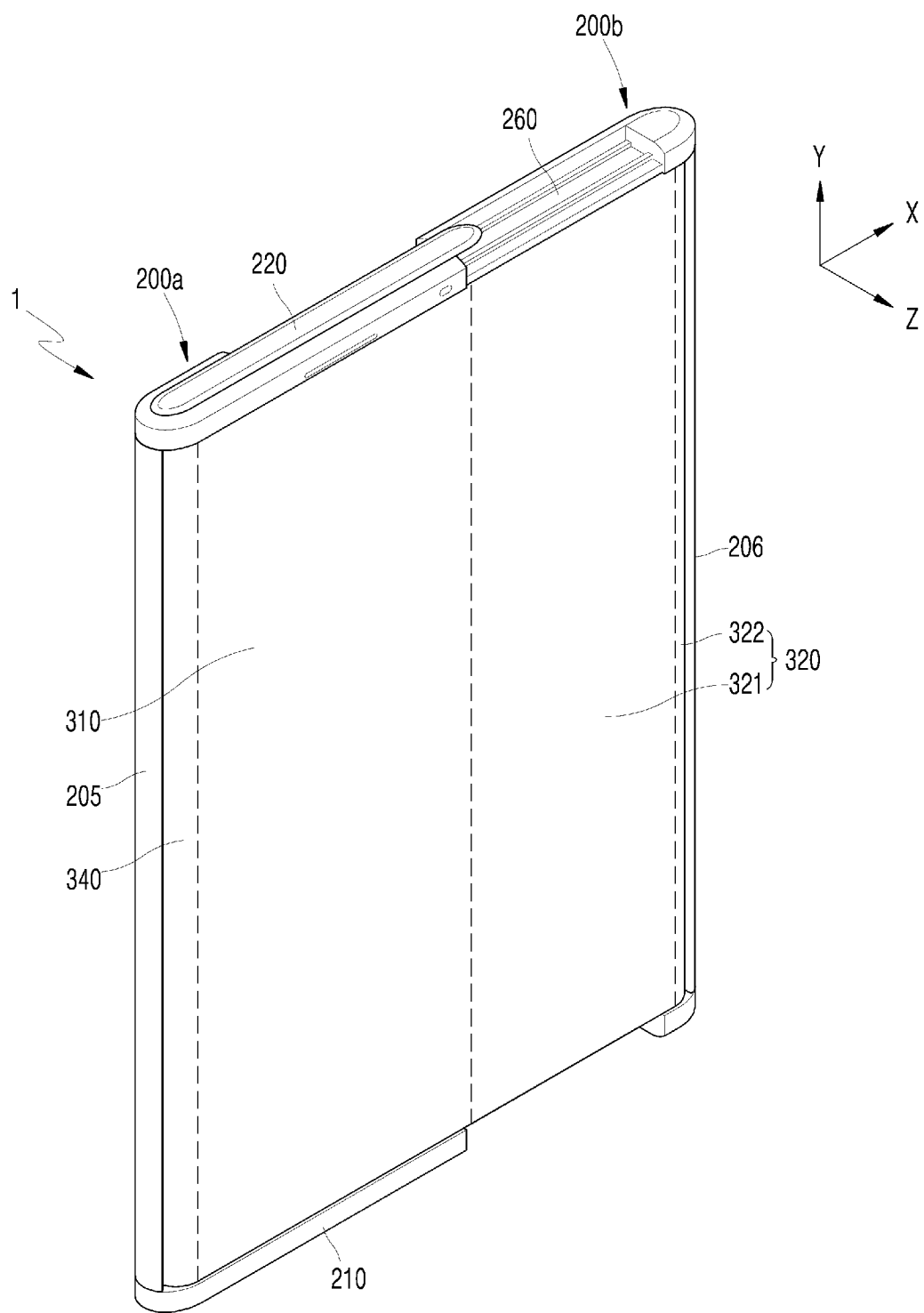
FIG. 2b is a perspective view of the flexible display device of FIG. 2a in a second state in which the flexible display has been deformed.

FIG. 2a is a perspective view of the flexible display device 1 in a first state, and FIG. 2b is a perspective view of the flexible display device 1 of FIG. 2a in a second state in which the flexible display has been deformed.

Figure 3A:
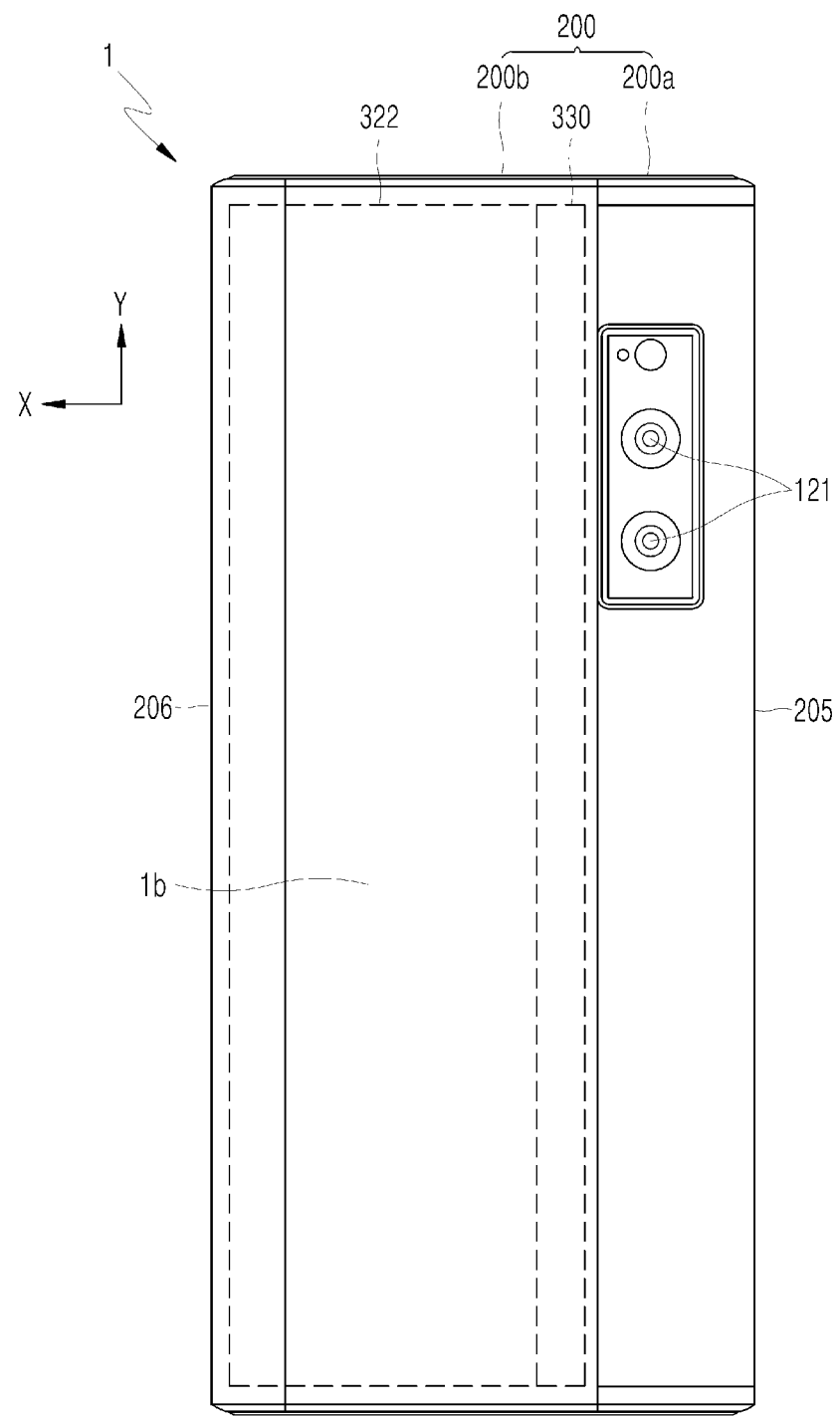
FIG. 3a is a rear view of the flexible display device of FIG. 2a, and FIG. 3b is a rear view of the flexible display device of FIG. 2b.
Figure 3B:
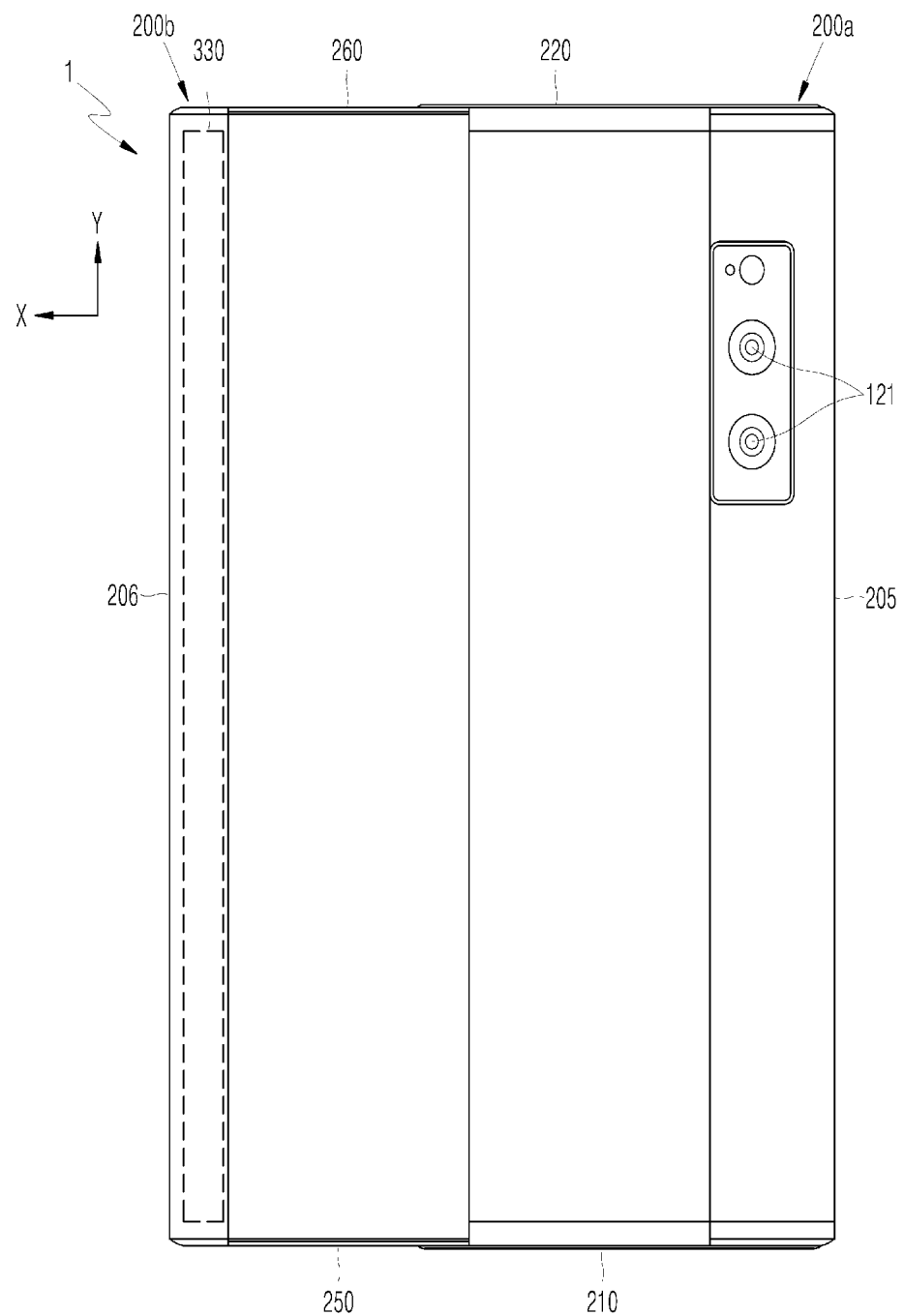

FIG. 3a is a rear view of the flexible display device 1 of FIG. 2a, and FIG. 3b is a rear view of the flexible display device 1 of FIG. 2b.

Figure 4:
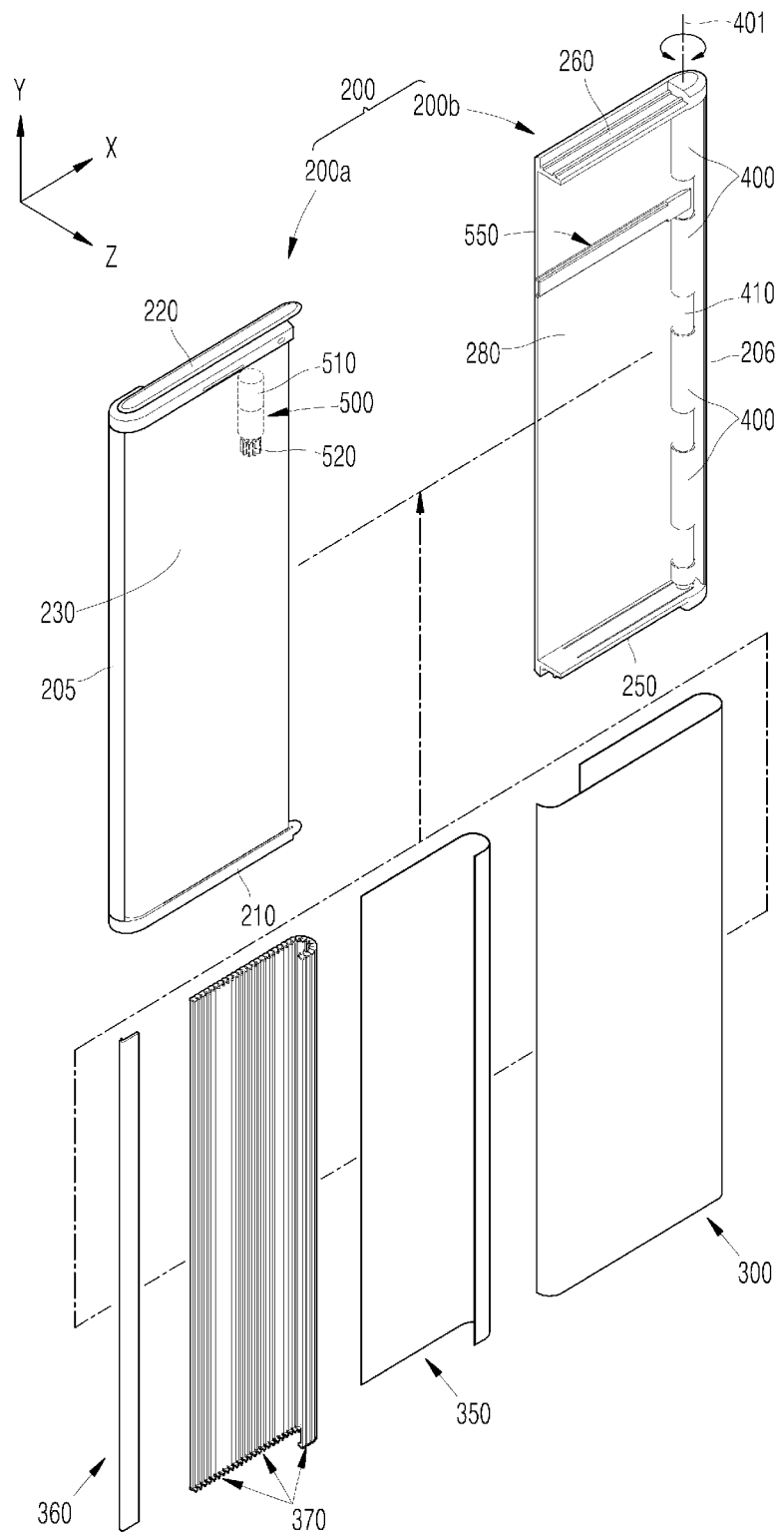

FIG. 4 is an exploded perspective view of the flexible display device 1 of FIG. 2a.

The flexible display device 1 may include a body 200, a plurality of support bars 370, and a support 400. The body 200 may include a first body 200a and a second body 200b.

In describing embodiments of the present disclosure, a first direction (X direction), a second direction (Y direction), and a third direction (Z direction) shown in the drawings are directions perpendicular to one another.

The flexible display device 1 may include two surfaces 1a and 1b which are opposite to each other. In other words, the flexible display device 1 may include a first surface 1a and a second surface 1b. A direction the first surface 1a faces (i.e. a direction perpendicular to or substantially perpendicular to the first surface 1a) may be opposite to a direction the second surface 1b faces (i.e. a direction perpendicular to or substantially perpendicular to the second surface 1b). In the flexible display device 1, the first surface 1a may face the third direction (Z direction), and the second surface 1b may face a direction opposite to the third direction (Z direction). When the first surface 1a is a front surface of the flexible display device 1, the second surface 1b may be a rear surface of the flexible display device 1.

Hereinafter, unless otherwise specified, the third direction (Z direction) refers to the forward direction of the flexible display device 1, and the direction opposite to the third direction (Z direction) refers to the rearward direction of the flexible display device 1.

The body 200 may form the overall shape of the flexible display device 1. The body 200 may form the frame of the flexible display device 1. The body 200 may be made of a relatively hard material.

For example, the body 200 may be made of plastic, carbon, metal, or a combination thereof. Other components of the flexible display device 1 may be coupled to the body 200.

The body 200 may be formed in various shapes so as to support other components coupled thereto.

The body 200 may have a flat shape as a whole, or may have a curved shape such as a curved surface. An interior of the body 200 may be fully filled or may not be fully filled.

For example, when viewed from the front (third direction), the body 200 may be formed in a quadrangular shape as a whole, and may be flat as a whole.

The body 200 may be divided into two or more parts. As described in detail above, the body 200 may include the first body 200a and the second body 200b, and the first body 200a and the second body 200b may be formed to move relative to each other (see FIGS. 2a, 2b, 3a, and 3b).

The second body 200b may slide and reciprocate relative to the first body 200a. Accordingly, when viewed from the front, the total area occupied by the body 200 may change as the second body 200b moves.

The second body 200b may reciprocate relative to the first body 200a between a first position and a second position.

When viewed from the front or rear, the total area occupied by the body 200 (the area of the body 200 projected in the Z direction) may be the smallest when the second body 200b is in the first position (see FIGS. 2a and 3a), and the total area occupied by the body 200 (the area of the body 200 projected in the Z direction) may be the largest when the second body 200b is in the second position (see FIGS. 2b and 3b).

When viewed from the front or rear, the overlapping area between the first body 200a and the second body 200b may be the largest when the second body 200b is in the first position (see FIGS. 2a and 3a), and the overlapping area between the first body 200a and the second body 200b may be the smallest when the second body 200b is in the second position (see FIGS. 2b and 3b).

A movement direction of the second body 200b relative to the first body 200a may be parallel to the first direction (X direction).

The first body 200a may have a predetermined length in the first direction (X direction), and may also have a predetermined length in the second direction (Y direction) orthogonal to the first direction. The first body 200a may have a predetermined length in the third direction (Z direction) orthogonal to the first and second directions, but the length of first body 200a in the third direction may be sufficiently small compared to the lengths thereof in the first and second directions. Accordingly, the first body 200a may be formed to be flat or substantially flat along the first and second directions.

The first body 200a may have a plate shape.

The second body 200b may have a predetermined length in the first and second directions. The second body 200b may have a predetermined length in the third direction, but the length of the second body 200b in the third direction may be sufficiently small compared to the lengths thereof in the first and second directions. Accordingly, the second body 200b may be formed to be flat or substantially flat in the first and second directions.

The second body 200b may have a plate shape.

The first body 200a and the second body 200b may be formed in the shape of plates parallel to each other.

Figure 5A:
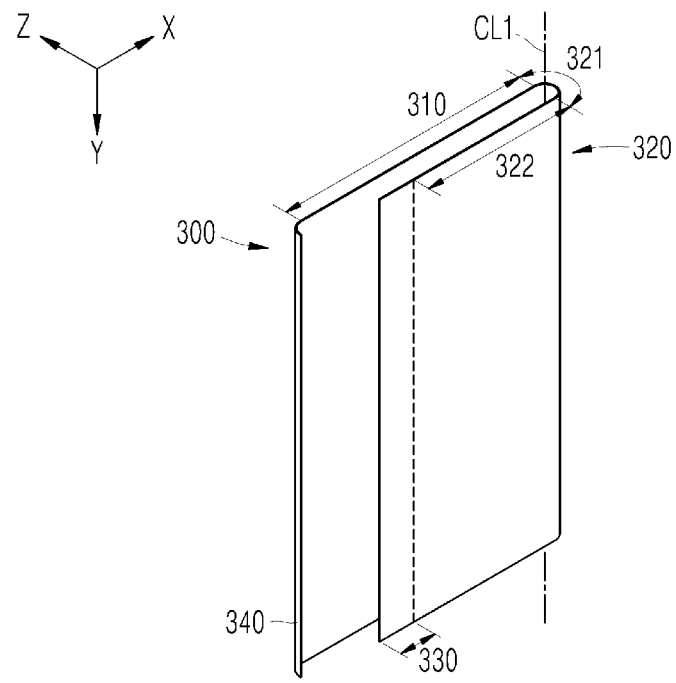
FIG. 5a is a perspective view of a flexible display separated from the flexible display device in the first state.
Figure 5B:
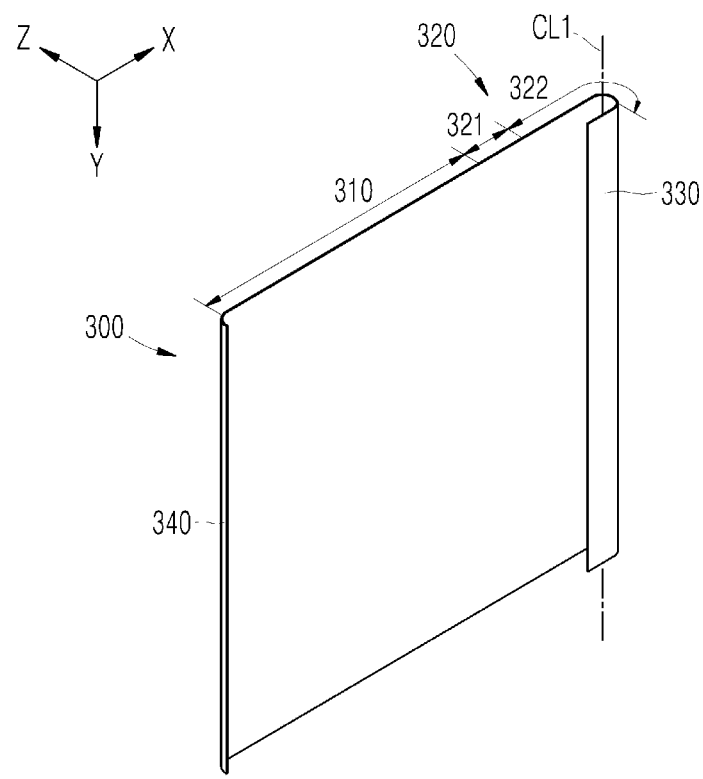
FIG. 5b is a perspective view of the flexible display of FIG. 5a when the flexible display has been deformed (i.e. when the flexible display device is in a second state).

FIG. 5a is a perspective view of a flexible display separated from the flexible display device in the first state, and FIG. 5b is a perspective view of the flexible display of FIG. 5a when the flexible display has been deformed (i.e. when the flexible display device is in a second state).

Figure 6A:
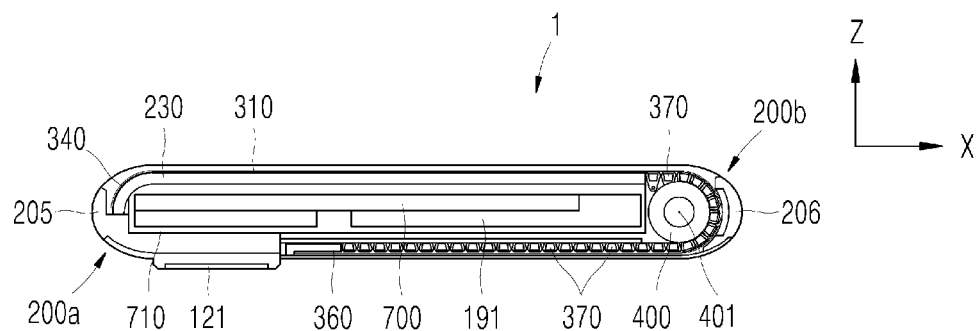
Figure 6B:
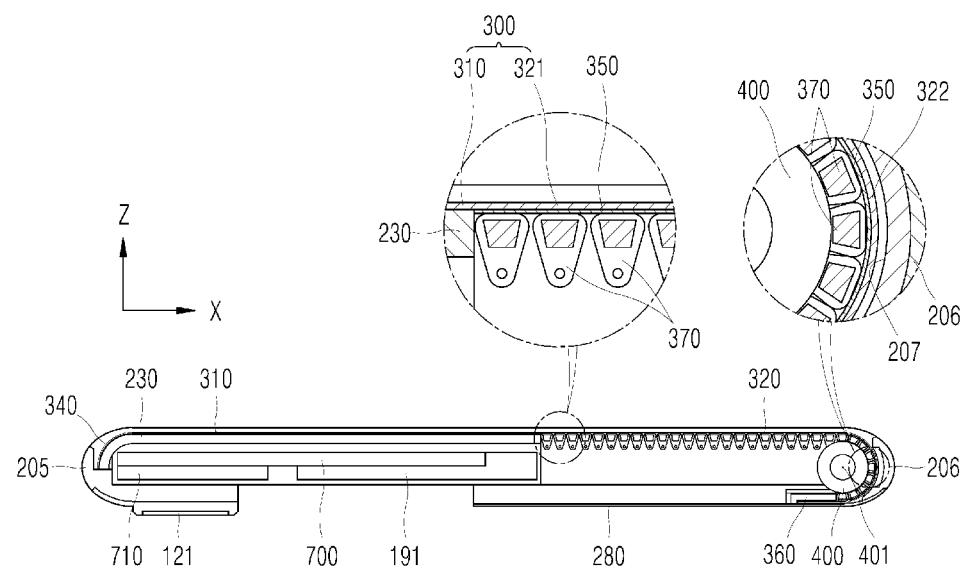
FIG. 6b is a cross-sectional view of the flexible display device of FIG. 6a when the flexible display device has been deformed.

FIG. 6a is a cross-sectional view taken along line A-A' of FIG. 2a. FIG. 6b is a cross-sectional view of the flexible display device of FIG. 6a when the flexible display device has been deformed.

Figure 7A:
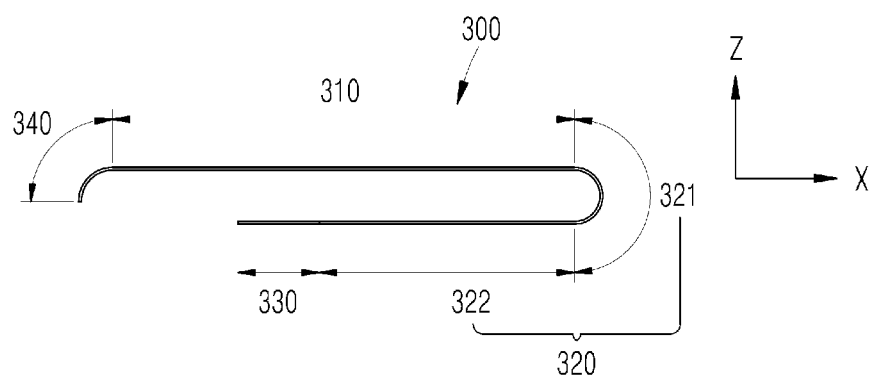
FIG. 7a is a rear view of the flexible display device of FIG. 2a, and FIG. 7b is a rear view of the flexible display device of FIG. 6b.
Figure 7B:

FIG. 7a is a rear view of the flexible display device of FIG. 6a, and FIG. 7b is a rear view of the flexible display device of FIG. 6b.

The support 400 may be fixed to the second body 200b.

The support 400 is formed along the second direction (Y). The support 400 may be elongated in the second direction (Y direction), and may have a constant cross section along the second direction.

In the flexible display device 1, the support 400 may be formed to support a portion of an inner surface of the flexible display 300. That is, a portion of the flexible display 300 may be curved around the support 400, and a direction of formation of the flexible display 300 may be changed along the circumferential direction of the support 400.

The support 400 may be formed to rotate in both directions about a central axis 401 which is parallel to the second direction. That is, the support 400 may be coupled to the second body 200b so as to rotate about the central axis 401.

The support 400 may be formed in the shape of a roller.

The flexible display 300 may be formed in the form of a thin film, and may have an outer surface and an inner surface. The outer surface of the flexible display 300 may be a surface facing an outside of the flexible display device 1, and the inner surface of the flexible display 300 may be a surface facing an inside of the flexible display device 1. An image may be displayed on at least a portion of the outer surface of the flexible display 300.

When the second body 200b moves relative to the first body 200a, the flexible display 300, which is formed such that at least a portion thereof is curved, may change in shape.

The flexible display 300 may include a first region 310 and a second region 320 which are connected to each other.

The flexible display 300 may include a first region 310, a second region 320, and a third region 330, which are sequentially connected. The flexible display 300 may include a fourth region 340.

If the flexible display 300 is not coupled to the body 200 and is spread flat, the fourth region 340, the first region 310, the second region 320, and the third region 330 may form a single plane.

Broken lines shown in FIG. 2b are imaginary lines respectively representing a boundary between the first region 310 and (a first connected region 321 of) the second region 320, a boundary between the first region 310 and the fourth region 340, and a boundary between the first connected region 321 and a second connected region 322.

The first region 310 may have a predetermined area and may be coupled to the body 200 from any one side of the body 200. The first region 310 may be coupled to the first body 200a, and may be fixed to the first body 200a. That is, the first region 310 may be formed so as not to move relative to the first body 200a.

The first region 310 may be parallel to the first and second directions. The first region 310 may be fixed in front of the first body 200a. The first region 310 may be fixed in front of the first body 200a based on the third direction. The first region 310 and the first body 200a may be coupled to each other so as to be parallel to each other.

In an embodiment of the present disclosure, the first region 310 may form a curved surface as a whole. Here, a curvature of the first region 310 may be smaller than a curvature of the first connected region 321, which will be described below, and a radius of curvature of the first region 310 may be greater than a radius of curvature of the first connected region 321. The radius of curvature of the first region 310 may be sufficiently greater than the radius of curvature of the first connected region 321. For example, when the radius of curvature of the first connected region 321 is "a," the radius of curvature of the first region 310 may be "10*a" or greater.

In another embodiment of the present disclosure, the first region 310 may form a plane surface as a whole. The first region 310 may form a planar outer surface of the flexible display 300 and may be disposed on a front surface of the body 200. The first region 310 may have a constant cross section in the first and second directions.

Hereinafter, description will be made on the assumption that the first region 310 of the flexible display device 1 is a plane surface.

A direction the first region 310 faces (i.e. a direction an outer surface of the first region 310 faces) may be the third direction. The first region 310 may form a part or the entirety of the first surface 1a of the flexible display device 1.

The fourth region 340 may extend from the first region 310 and form an end portion of the flexible display 300. The fourth region 340 may have a constant cross section along the second direction, and may form a curved surface.

An image may be displayed on the fourth region 340.

The second region 320 may extend from the first region 310, and a portion of the second region 320 may be curved around support 400. That is, a direction of formation of the second region 320 may be changed as the second region 320 passes around the support 400.

The second region 320 may have a constant cross section along the second direction.

A portion of the second region 320 may be curved into a semicircular shape, and a curved position of the second region 320 may change according to movement of the second body 200b. When the second body 200b is in the first position, the first connected region 321 may be curved into a semicircular shape, and when the second body 200b is in the second position, a portion of the second connected region 322 may be curved into a semicircular shape.

The second region 320 may include the first connected region 321 and a second connected region 322.

The first connected region 321 may be directly connected to the first region 310, and the second connected region 322 may be directly connected to the first connected region 321 and the third region 330.

When the second body 200b is in the first position, the first connected region 321 may form a curved surface along the circumferential direction of the support 400.

When the second body 200b is in the first position, the first connected region 321 may form an outer surface of the flexible display 300 that is curved about a curvature center line CL1. When the second body 200b is in the first position, the curvature center line CL1 may be an imaginary straight line that forms a center of curvature of the first connected region 321, and may be parallel to the second direction.

When the second body 200b is in the first position, a cross section of the first connected region 321 may form a semicircular shape.

The curvature center line CL1 may coincide with the central axis 401 of support 400.

When the second body 200b is in the second position, the curvature center line CL1 may be a center of curvature of the second connected region 322 forming a curved surface.

An image may be displayed on the first connected region 321 and the first region 310.

A surface area of the first region 310 may be greater than a surface area of the first connected region 321.

When the second body 200b is in the first position, the second connected region 322 may form an outer surface of the flexible display 300 that is an opposite surface to the first region 310. That is, when the second body 200b is in the first position, and the first region 310 faces the third direction (Z direction), the second connected region 322 may face the opposite direction to the third direction (Z direction). An image may be displayed on the second connected region 322.

The second connected region 322 may have a constant cross section along the second direction. When the second body 200b is in the first position, the second connected region 322 may have a constant cross section along the first direction.

The flexible display 300 may be formed in such a manner that the first region 310, the first connected region 321, and the second connected region 322 are sequentially connected, and when the second body 200b is in the first position, the first region 310, the first connected region 321, and the second connected region 322 may form a U-shape as a whole.

In one embodiment of the present disclosure, when the second body 200b is in the first position, the second connected region 322 may form a curved surface as a whole. Here, a curvature of the second connected region 322 may be smaller than a curvature of the first connected region 321, and a radius of curvature of the second connected region 322 may be greater than a radius of curvature of the first connected region 321. The radius of curvature of the second connected region 322 may be sufficiently greater than the radius of curvature of the first connected region 321. For example, when the radius of curvature of the first connected region 321 is "a," the radius of curvature of the second connected region 322 may be "10*a" or greater.

In another embodiment of the present disclosure, when the second body 200b is in the first position, the second connected region 322 may form a plane surface as a whole. In addition, the second connected region 322 may be parallel to the first region 310. Hereinafter, description will be made on the assumption that when the second body 200b is in the first position, the second connected region 322 forms a plane surface and is parallel to the first region 310.

The third region 330, on the opposite side to the first region 310, may extend from the second region 320. The third region 330 may be formed to extend from the second connected region 322 and may form an end portion of the flexible display 300.

In the flexible display 300, the first region 310, the second region 320, and the fourth region 340 may be configured to display an image thereon, and the third region 330 may be configured not to display an image thereon. In the flexible display 300, the third region 330 may be an extended portion of a display substrate, and may form a dummy portion on which an image is not displayed.

The third region 330 may be formed separately from the flexible display 300 and then be coupled to the flexible display 300.

Or, the third region 330 may be formed integrally with the flexible display 300 in the manufacturing process of the flexible display 300. The third region 330 may be formed as a substrate of the flexible display 300.

The third region 330 may be formed in the form of a plastic film, and may be flexibly curved.

The camera 121 may be fixed to a rear surface of the body 200. The camera 121 may be coupled to the body 200 so as to face the opposite direction of the third direction (Z direction).

The camera 121 may be fixed to a rear surface of the first body 200a.

The camera 121 may be fixed to the body 200 at a portion away from the support 400. That is, if the support 400 is coupled to the body 200 at a lower portion of the flexible display device 1, the camera 121 may be coupled to the body 200 at an upper portion of the flexible display device 1. The camera 121 may be fixed to an edge of the first body 200a that is farthest from the support 400.

The camera 121 may be two or more cameras 121 arranged in the second direction.

The first body 200a may include a support plate 230.

The support plate 230 may be formed in a flat plate shape, and may be formed in a size the same as or similar to a size of the first region 310. The support plate 230 may be coupled in a form in which the first region 310 is laminated on an outside (front side) of the support plate 230, and the support plate 230 may support the first region 310 from inside the first region 310.

The first body 200a may include a first edge portion 205.

The first edge portion 205 may form any one edge of the flexible display device 1. The first edge portion 205 may form any one side of the flexible display device 1 having a rectangular shape.

The first edge portion 205 may form an upper side edge of the first body 200a.

The first edge portion 205 may be fixed to the first body 200a. The first edge portion 205 may be integrally formed with the first body 200a, or may be formed separately from the first body 200a and then fixed thereto.

The first edge portion 205 may generally be formed to extend in the second direction (Y direction).

At least a portion of the first edge portion 205 may have a constant cross section in the second direction (Y direction). An outer surface of the first edge portion 205 may form a convex curved surface, and the cross section of the first edge portion 205 may have, for example, a semicircular shape.

The fourth region 340 may be fixed to the first edge portion 205.

The first body 200a may include a first side edge portion 210 and a second side edge portion 220. The first side edge portion 210 and the second side edge portion 220 may form edges on both sides of the first body 200a, and may extend in the first direction. The first side edge portion 210 may be formed over the entire section of any one edge of the first body 200a, or may be formed over a partial section thereof. The second side edge portion 220 may be formed over the entire section of any one edge of the first body 200a, or may be formed over a partial section thereof.

The first side edge portion 210 and the second side edge portion 220 may be formed to be parallel to the first direction, and may have constant cross sections in the first direction. If the first side edge portion 210 forms a left side edge of the first body 200a, the second side edge portion 220 may form a right side edge of the first body 200a.

The second body 200b may include a second edge portion 206.

The second edge portion 206 may form an edge of the flexible display device 1 on the opposite side of the flexible display device 1 to the first edge portion 205. If the first edge portion 205 forms an upper side edge of the flexible display device 1, the second edge portion 206 may form a lower side edge of the flexible display device 1.

The second edge portion 206 may be disposed at an outer side of the support 400.

Between the second edge portion 206 and the support 400, a gap 207, which is relatively narrow, may be provided, and through the gap 207, the flexible display 300 may move, forming a curved surface (see FIGS. 6a and 6b).

In addition, a connection arm 373 of the support bar 370 may move through the gap 207.

The second edge portion 206 may be fixed to the second body 200b. The second edge portion 206 may be integrally formed with the second body 200b, or may be formed separately from the second body 200b and then fixed thereto.

The second edge portion 206 may generally be formed to extend in the second direction (Y direction).

At least a portion of the second edge portion 206 may have a constant cross section along the second direction (Y direction). An outer surface of the second edge portion 206 may form a convex curved surface, and a cross section of the second edge portion 206 may have a semicircular shape.

The second body 200b may include a third side edge portion 250 and a fourth side edge portion 260. The third side edge portion 250 and the fourth side edge portion 260 may form edges on both sides of the second body 200b, and may be formed to extend in the first direction. The third side edge portion 250 and the fourth side edge portion 260 may be formed to be parallel to the first direction, and may have constant cross sections along the first direction.

If the third side edge portion 250 forms a left side edge of the second body 200b, the fourth side edge portion 260 may form a right side edge of the second body 200b.

The third side edge portion 250 may be disposed to align with the first side edge portion 210, and may be disposed so as to come into close contact with the first side edge portion 210 or to be close thereto.

The third side edge portion 250 may be disposed at an outer side of the first side edge portion 210 or at an inner side of the first side edge portion 210.

The fourth side edge portion 260 may be disposed to align with the second side edge portion 220, and may be disposed so as to come into close contact with the second side edge portion 220 or to be close thereto.

The fourth side edge portion 260 may be disposed at an outer side of the second side edge portion 220 or at an inner side of the second side edge portion 220.

The flexible display device 1 may include a back cover 280.

The back cover 280 may be formed in a shape of a plate that is substantially parallel to the first direction (X direction) and the second direction (Y direction). The back cover 280 may be parallel to or substantially parallel to the first region 310.

The back cover 280 may form a rear surface of the second body 200b. The back cover 280 may be fixed to the second body 200b or may be detachably coupled to the second body 200b.

The back cover 280 may be formed to be transparent or opaque.

When the second body 200b is in the first position, a surface area of the back cover 280 may correspond to a surface area of the second connected region 322, or may be equal to or greater than the surface area of the second connected region 322.

When the back cover 280 is formed to be transparent, an image displayed on the second connected region 322 while the second body 200b is in the first position may be seen through the back cover 280.

The flexible display device 1 according to the embodiment of the present disclosure may include a plurality of support bars 370.

Each of the plurality of support bars 370 may be formed to extend generally in the second direction, and may be fixed to an inner surface of the second region 320. The plurality of support bars 370 may be directly fixed to the second region 320, or may be fixed thereto by means of a separate element.

Each of the plurality of support bars 370 may support the first connected region 321 or the second connected region 322 from inside the first connected region 321 or the second connected region 322, and the plurality of support bars 370 may be disposed one by one along the first connected region 321 and the second connected region 322.

Each of the plurality of support bars 370 may be disposed to be parallel to one another.

The plurality of support bars 370 may be made of a relatively hard material so as to support the flexible display 300. The plurality of support bars 370 may be made of plastic or metal.

The flexible display device 1 may further include an inner plate 350.

The inner plate 350 may be coupled in a form in which the inner plate 350 is stacked on an inner surface of the flexible display 300.

The inner plate 350 may be formed of a metal plate having elasticity. The inner plate 350 may include a superelastic metal. The inner plate 350 may be formed in a shape of a relatively thin plate. The inner plate 350 may have a thickness in the range of 0.05 mm to 0.2 mm, and may have a thickness of 0.1 mm According to an embodiment of the present disclosure, the inner plate 350 may be formed in the same or similar size and in the same or similar shape as the flexible display 300 such that the inner plate 350 is coupled to an entire inner surface of the flexible display 300.

According to another embodiment of the present disclosure, the inner plate 350 may be formed in the same or similar size and in the same or similar shape as the second region 320 such that the inner plate 350 is coupled to an inner surface of the second region 320.

The inner plate 350 may facilitate elastic deformation and elastic recovery of the flexible display 300.

When the inner plate 350 is provided in the flexible display device 1, the plurality of support bars 370 may be coupled to the flexible display 300 by means of the inner plate 350. That is, the inner plate 350 may be fixed to the inner surface of the flexible display 300, and the plurality of support bars 370 may be fixed to an inner surface of the inner plate 350.

The flexible display device 1 may further include a sliding plate 360.

The sliding plate 360 may generally be formed in a shape of a flat plate extending along the second direction. The sliding plate 360 may be made of metal, plastic, and the like.

The sliding plate 360 may be fixed to an end portion of the flexible display 300. The sliding plate 360 may be fixed to the third region 330.

The sliding plate 360 may be coupled to the second body 200b such that the sliding plate 360 moves relative to the second body 200b along the first direction.

The sliding plate 360 may be slidably coupled to the second body 200b, and for this, both end portions of the sliding plate 360 may respectively be inserted into a first rear guide groove 252 and a second rear guide groove 262 and move therein.

Figure 8A:
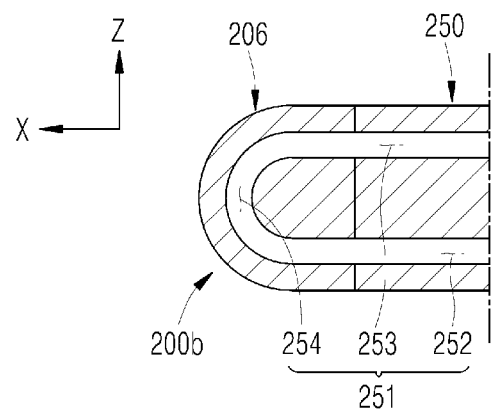
FIG. 8a is a cross-sectional view illustrating inner surfaces of a third side edge portion and a second edge portion.
Figure 8B:
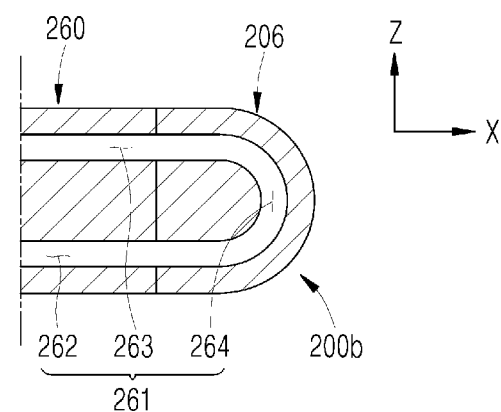
FIG. 8b is a cross-sectional view illustrating inner surfaces of a fourth side edge portion and the second edge portion.

FIG. 8a is a cross-sectional view illustrating inner surfaces of a third side edge portion 250 and a second edge portion 206, and FIG. 8b is a cross-sectional view illustrating inner surfaces of a fourth side edge portion 260 and the second edge portion 206.

Figure 9:
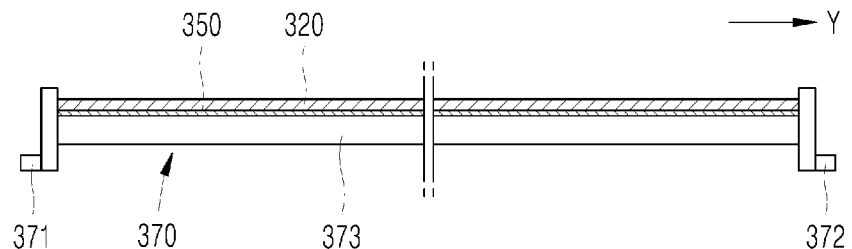
FIG. 9 is a cross-sectional view schematically illustrating a state in which a support bar, an inner plate, and a flexible display are coupled.

FIG. 9 is a cross-sectional view schematically illustrating a state in which the support bar 370, the inner plate 350, and the flexible display 300 are coupled.

The second body 200b may include a first movement guide groove 251 and a second movement guide groove 261.

The first movement guide groove 251 may be formed as a U-shaped groove, and may form a path into which a first support slider 371, which will be described below, is inserted and moves therein.

The second movement guide groove 261 may be formed as a U-shaped groove, and may form a path into which a second support slider 372, which will be described below, is inserted and moves therein.

The first movement guide groove 251 may include a first rear guide groove 252, a first front guide groove 253, and a first connection guide groove 254.

The second movement guide groove 261 may include a second rear guide groove 262, a second front guide groove 263, and a second connection guide groove 264.

The first rear guide groove 252 and the first front guide groove 253 may be formed in the third side edge portion 250, and the second rear guide groove 262 and the second front guide groove 263 may be formed in the fourth side edge portion 260.

In one embodiment of the present disclosure, the first connection guide groove 254 may be formed in the third side edge portion 250, and the second connection guide groove 264 may be formed in the fourth side edge portion 260. In another embodiment of the present disclosure, the first connection guide groove 254 and the second connection guide groove 264 may be formed in the second edge portion 206.

The first rear guide groove 252 may form a space inside the third side edge portion 250, may have a constant cross section along the first direction, and may be formed to be open inwards from a rear side of the third side edge portion 250.

The first front guide groove 253 may form a space inside the third side edge portion 250, may have a constant cross section along the first direction, and may be formed to be open inwards from a front side of the third side edge portion 250. The first front guide groove 253 may be symmetric with respect to the first rear guide groove 252.

The first connection guide groove 254 may form a semi-circular-shaped space inside the second edge portion 206 of the second body 200b and may connect the first rear guide groove 252 to the first front guide groove 253.

The first rear guide groove 252, the first connection guide groove 254, and the first front guide groove 253 may form a U-shaped space together, and may form a movement path of the plurality of support bars 370 (in particular, the first support slider 371) to serve as a rail, which will be described below.

The second rear guide groove 262 may form a space inside the fourth side edge portion 260, may have a constant cross section along the first direction, and may be formed to be open inwards from a rear side the fourth side edge portion 260.

The second front guide groove 263 may form a space inside the fourth side edge portion 260, may have a constant cross section along the first direction, and may be formed to be open inwards from a front side of the fourth side edge portion 260. The second front guide groove 263 may be symmetric with respect to the second rear guide groove 262.

The second connection guide groove 264 may form a semicircular-shaped space inside the second edge portion 206 of the second body 200b and may connect the second rear guide groove 262 to the second front guide groove 263.

The second rear guide groove 262, the second connection guide groove 264, and the second front guide groove 263 may form a U-shaped space together, and may form a movement path of the plurality of support bars 370 (in particular, the second support slider 372) to serve as a rail, which will be described below.

The first rear guide groove 252, the first front guide groove 253, and the first connection guide groove 254 may respectively be symmetric to the second rear guide groove 262, the second front guide groove 263, and the second connection guide groove 264.

Each of the plurality of support bars 370 may be formed to extend in the second direction (Y direction) as a whole.

Each of the plurality of support bars 370 may include a first support slider 371, a second support slider 372, and a connection arm 373.

The first support slider 371 may form an end portion of the support bars 370 at one side thereof.

The first support slider 371 may be inserted into the first rear guide groove 252, the first connection guide groove 254, and the first front guide groove 253, so as to move along the space (path) formed by the first rear guide groove 252, the first connection guide groove 254, and the first front guide groove 253.

The second support slider 372 may form the other end portion of the support bars 370 at the opposite side thereof to the first support slider 371.

The second support slider 372 may be inserted into the second rear guide groove 262, the second connection guide groove 264, and the second front guide groove 263, so as to move along the space (path) formed by the second rear guide groove 262, the second connection guide groove 264, and the second front guide groove 263.

The connection arm 373 may have a constant cross section along the second direction (Y direction).

The connection arm 373 may connect the first support slider 371 to the second support slider 372, may support an inner surface of the flexible display 300, and may assist in maintaining the first connected region 321 and the second connected region 322 in a stable plane surface or curved surface.

The connection arm 373 may be formed in such a shape that a cross section thereof is a trapezoid (i.e. in a shape in which a width of the connection arm 373 becomes increasingly smaller away from a rear surface of the flexible display 300).

The plurality of support bars 370 may have a predetermined thickness such that when the plurality of support bars 370, which are successively arranged, form a plane parallel to the first region 310, the second region 320, which is supported by the support bars 370, are maintained stable like the first region 310.

A front surface of the connection arm 373 and a front surface of the support plate 230 may form a single plane.

The second region 320 may be maintained in a stable state by means of the support bars 370. In particular, when the second region 320 is formed as a touch screen to receive a touch input, the second region 320 may be stably supported by the support bars 370.

Figure 10:
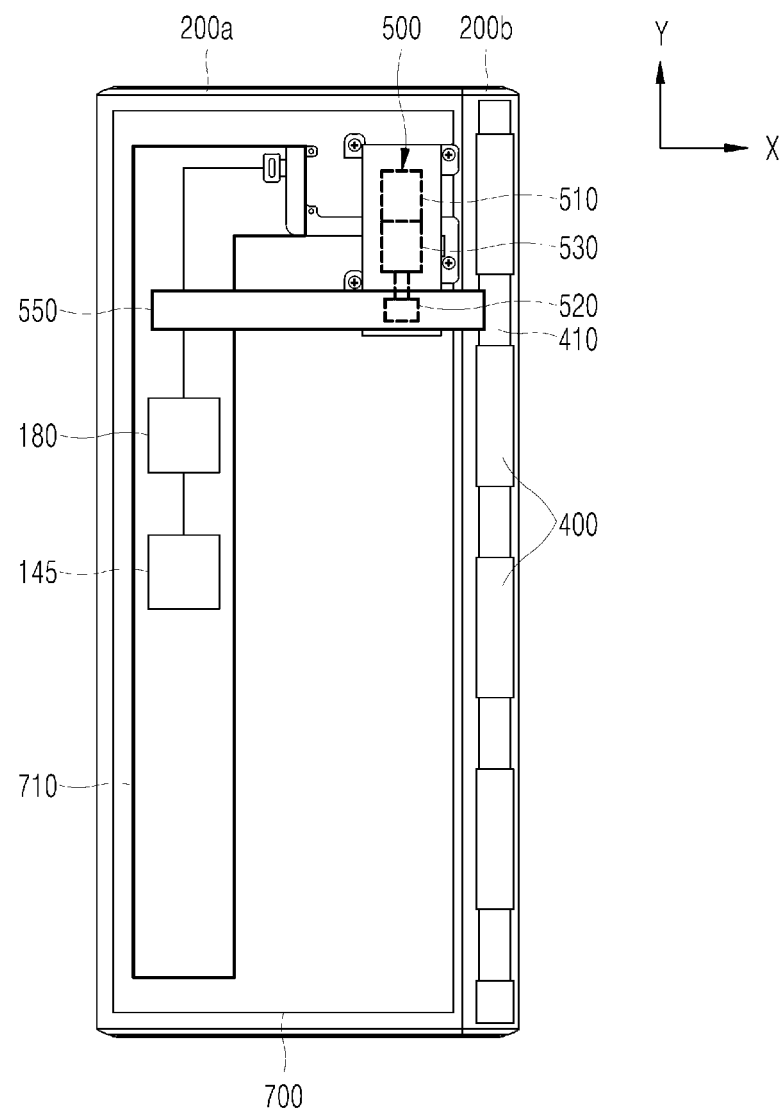
FIG. 10 is a view schematically illustrating a coupling and connection relationship of some components provided in the flexible display device.

FIG. 10 is a view schematically illustrating a coupling and connection relationship of some components provided in the flexible display device 1.

Figure 11A:
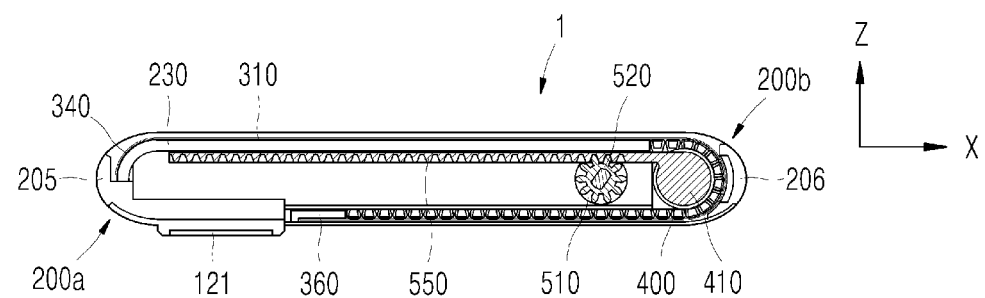
Figure 11B:
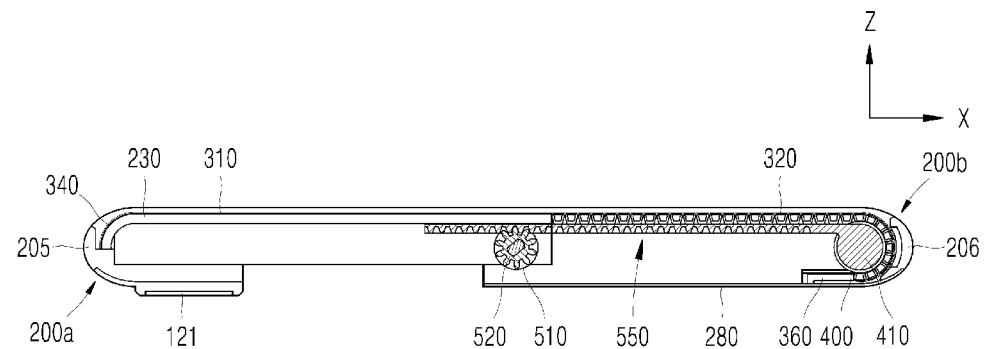
FIG. 11b is a cross-sectional view of the flexible display device of FIG. 11a when the flexible display device has been deformed.

FIG. 11a is a cross-sectional view taken along line B-B' of FIG. 2a. FIG. 11b is a cross-sectional view of the flexible display device 1 of FIG. 11a when the flexible display device 1 has been deformed.

Figure 12:
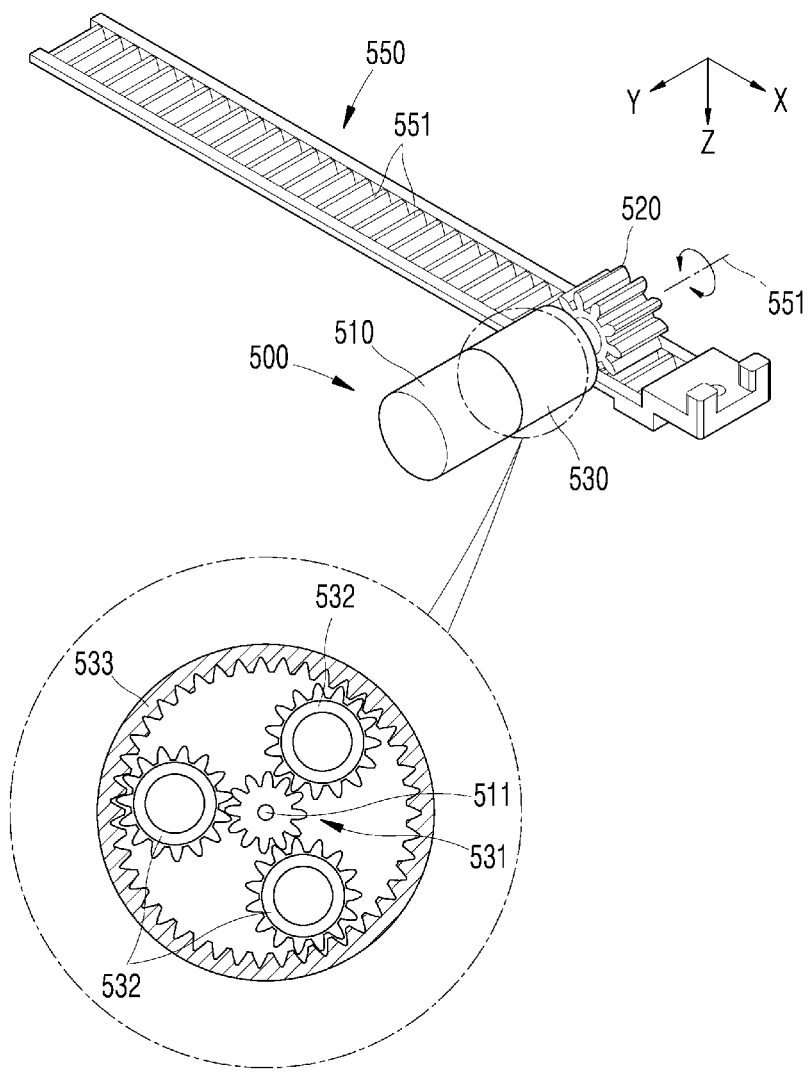
FIG. 12 is a perspective view illustrating a state in which a driving gear and a rack of an actuator are engaged with each other.

FIG. 12 is a perspective view illustrating a state in which a driving gear 520 and a rack 550 of an actuator are engaged with each other.

The first body 200a includes a fixing frame 700 forming at least a portion of the first body 200a. The fixing frame 700 is made of a relatively rigid material, and may be made of, for example, plastic, carbon, metal, or a combination thereof.

The fixing frame 700 may form the interior or the exterior of the first body 200a. Other components may be fixedly coupled to the fixing frame 700. The shape, structure, and material of the fixing frame 700 may be implemented in diverse forms.

A printed circuit board (PCB 710) may be coupled to the fixing frame 700, and the PCB 710 may form a main board of the flexible display device 1.

All or some of the memory 170, the controller 180, and the sensor 140 described above may be fixedly coupled to the PCB 710.

The battery 191 described above may be fixed to the fixing frame 700, and may supply power to each component of the flexible display device 1.

In one embodiment, in order to improve the portability of the flexible display device 1 used as a mobile terminal, the capacity of the battery needs to be made relatively large. In doing so, the size and mass of the battery may be enlarged to occupy a significant proportion of the overall size and mass of the flexible display device 1. For example, the battery may be a lithium ion battery having a mass of 80 g and a capacity of 3000 mAh, and the flexible display device 1 including the battery may have a total mass of 180 g.

In one embodiment of the present disclosure, the main board (the PCB 710), the battery 191, the camera 121, the actuator 500, and the like, which constitute the flexible display device 1, are connected to the first body 200a. As such, the combination of the first body 200a and the parts coupled thereto (a first group 10) may be heavier than the combination of the second body 200b and the parts coupled thereto (a second group 20).

The actuator 500 may cause the second body 200b to reciprocate relative to the first body 200a. The actuator 500 may cause the second body 200b to linearly reciprocate, and may be implemented as any of various devices capable of implementing linear reciprocating motion. The actuator 500 may be implemented as a device that converts rotational motion into linear motion.

In one embodiment, the actuator may include a linear motor, and in another embodiment, the actuator may include a motor, a pulley rotated by the motor, and a chain or belt fastened to the pulley.

The actuator 500 may be fixed to the first body 200a, and may be configured to transmit power to the second body 200b such that the second body 200b moves relative to the first body 200a. The actuator 500 may be fixed to the fixing frame 700.

The actuator 500 may include a driving motor 510 and a driving gear 520. The driving motor 510 may be configured as a common electric motor, and may be configured as a BLDC motor or a step motor, for example. The driving gear 520 is rotated by the rotation of the driving motor 510 while interlocking therewith.

The actuator 500 may further include a gearbox 530.

The gearbox 530 is coupled to the rotational axis of the driving motor 510, and is also coupled to the rotational axis of the driving gear 520. The gearbox 530 is configured to transmit rotational power of the driving motor 510 to the driving gear 520. The gearbox 530 may include therein a plurality of gears that interlock with the driving motor 510 and the driving gear 520, and accordingly, rotational power may be transmitted, in order, to the rotational axis of the driving motor 510, the gears inside the gearbox 530, and the driving gear 520.

In the actuator 500, gear shifting may be performed by the gearbox 530, and the rotational speed of the rotational axis of the driving motor 510 and the driving gear 520 may be different from each other.

In one embodiment, the gearbox 530 may be configured as a planetary gear box. Here, inside the gearbox 530, a sun gear 531, a planet gear 532, and a ring gear 533 may be provided, and the sun gear 531, the planet gear 532, and the ring gear 533 may rotate in engagement with each other. The rotational speed of the driving motor 510 may be reduced by the gearbox 530 and transmitted to the driving gear 520.

The driving gear 520 may be implemented in the form of, for example, a common pinion gear. The rotational axis of the driving gear 520 may be parallel to the second direction (Y direction).

The central axis (rotational axis 511) of the driving motor 510, the driving gear 520, and the gear box 530 may all be formed along the same straight line.

The flexible display device 1 may include a rack 550.

A gear 551 that engages with the driving gear 520 is formed on the rack 550 such that the teeth of the gear 551 are successively formed along the first direction (X direction). The rack 550 may be integrally formed with the second body 200b, or may be formed separately from the second body 200b and then fixedly coupled thereto.

An end portion of the rack 550 in the first direction (X direction) may be fixed to an inner shaft 410 of the second body 200b. The inner shaft 410 is elongated in the second direction (Y direction), and the roller-shaped support 400 is rotatably coupled to the inner shaft 410.

While transmitting rotational power of the driving motor 510 to the rack 550, the driving gear 520 enables the rack 550 and the second body 200b to linearly reciprocate relative to the first body 200a in the first direction and the opposite direction to the first direction.

For the purpose of smooth movement of the second body 200b relative to the first body 200a, a gear module value of the gear of the rack 550 and the driving gear 520 may be 0.3 mm.

The flexible display device 1 may include a first sensor 145.

The first sensor 145 may be configured to detect free fall of the flexible display device 1.

The controller 180 connected to the first sensor 145 may be configured to control the operation of the flexible display device 1 according to information sensed by the first sensor 145. The controller 180 may cause the flexible display device 1 to perform a specific operation in response to the information sensed by the first sensor 145 meeting a preset condition.

In one embodiment, the controller 180 may control the second body 200b such that the second body 200b moves relative to the first body 200a in response to a value sensed by the first sensor 145 meeting a preset reference value or falling within a preset reference range. Specifically, the controller 180 may be configured to control the operation of the actuator 500 according to the information or value sensed by the first sensor 145, and control movement of the second body 200b accordingly.

The first sensor 145 may be configured as one of various types of sensors capable of detecting free fall of the flexible display device 1.

In one embodiment, the first sensor 145 may form part of the sensor 140 described above. The first sensor 145 may be configured as an acceleration sensor, a G-sensor, or a gyroscope sensor, or a combination thereof.

For example, the first sensor 145 may be configured as a 6-axis gyro sensor.

The first sensor 145 is coupled to the first body 200*a* or the second body 200*b*. In one embodiment, the first sensor 145 may be coupled and fixed to the PCB 710 described above.

The first sensor 145 may detect free fall of the flexible display device 1 via various methods, and the controller 180 may cause the actuator 500 to operate in response to free fall being detected by the first sensor 145.

As described above, the first sensor 145 may include an acceleration sensor and a gyro sensor. In one embodiment, when the flexible display device 1 is in free fall, the acceleration sensor included in the first sensor 145 may measure the amount of movement in three axes (X direction, Y direction, and Z direction), and the gyro sensor included in the first sensor 145 may measure the amount of rotation in three axes. Here, 'free fall' may be detected in response to the respective measured values exceeding respective reference values (here, the reference values may be determined in advance, but can also be changed by the user), and information regarding the free fall may be transmitted to the controller 180.

In another embodiment, the first sensor 145 may detect free fall of the flexible display device 1 by measuring gravitational acceleration ($m/s^2$). When a flexible display device 1 positioned at a certain height free falls in the direction of gravity, the gravitational acceleration (or gravity) experienced by the flexible display device 1 becomes 0. The controller 180 of the flexible display device 1 may determine whether the flexible display device 1 is in free fall by referring to the gravitational acceleration value measured by the first sensor 145.

Since the fact that the gravitational acceleration (or gravity) experienced by a free-falling object is 0G is a fundamental of classical physics, detailed description thereof will be omitted for purposes of simplicity in describing the present specification. This fact will be easily understood by considering a passenger's experience of weightlessness in a free-falling airplane. Passengers in a free-falling airplane experience a state of weightlessness because they do not receive a reaction force against gravity generated between themselves and the Earth.

As described above, the first sensor 145 may measure the gravitational acceleration, and in response to the gravitational acceleration value measured by the first sensor 145 being 0G or a value in a predetermined range close to 0G, the controller may determine that the flexible display device 1 is in free fall.

When free fall is detected by the first sensor 145, the controller 180 may control the operation of the actuator 500 such that the second body 200*b* moves in the first direction (X direction).

For example, when free fall is detected while the second body 200*b* is in the first position, the controller 180 may cause the actuator 500 to operate so as to move the second body 200*b* in the first direction. Accordingly, before the flexible display device 1 contacts the floor B, the second body 200*b* may move in the first direction so as to be fully in the second position or at a position short of the second position.

In another embodiment, in response to free fall being detected by the first sensor 145, the actuator 500 may be operated such that the second body 200*b* moves in the opposite direction to the first direction.

For example, when free fall is detected while the second body 200*b* is in the second position, the controller 180 may cause the actuator 500 to operate so as to move the second body 200*b* in the opposite direction to the first direction. Accordingly, before the flexible display device 1 contacts the floor B, the second body 200*b* may move in the opposite direction to the first direction, and may move fully to the first position or to a position short of the first position.

Figure 13A:
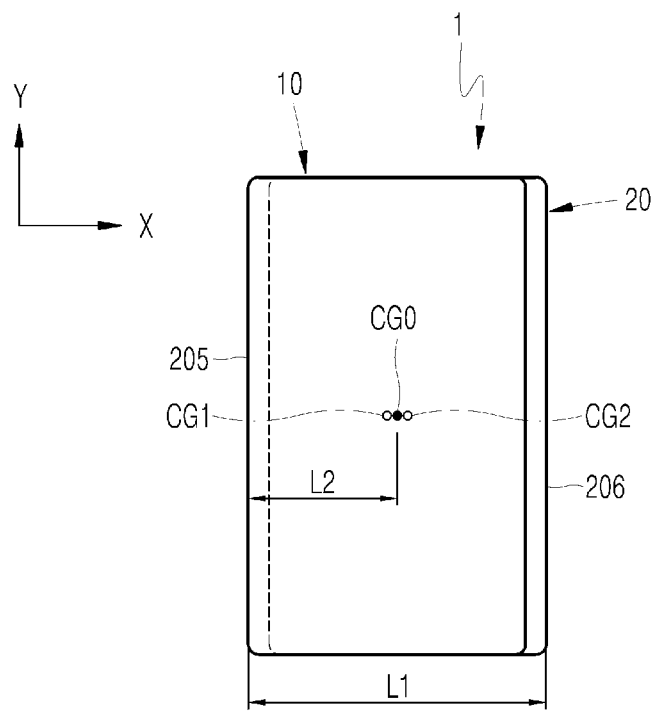
FIG. 13a is a view illustrating a center of gravity of a flexible display device in a first state.
Figure 13B:
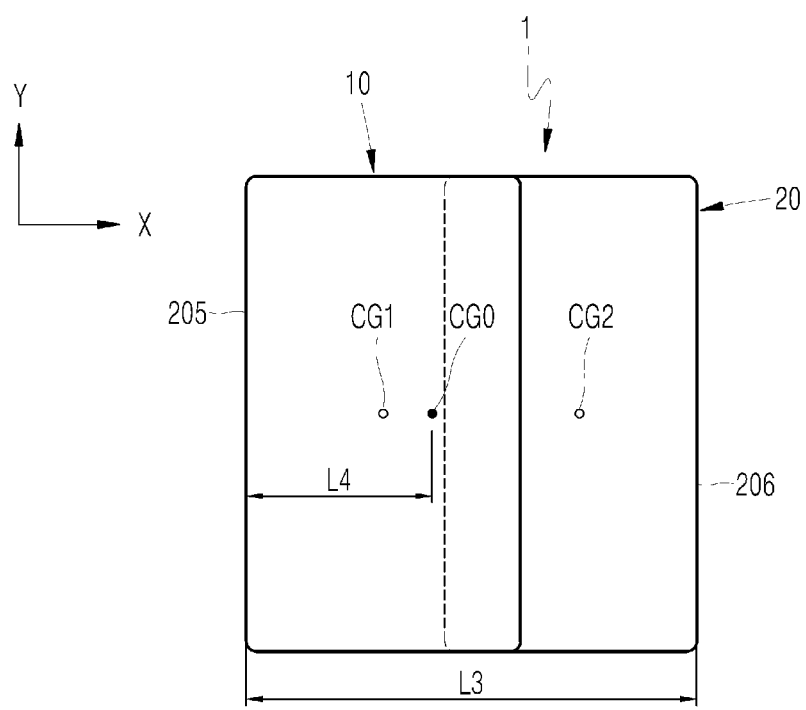
FIG. 13b is a view illustrating the center of gravity of a flexible display device in a second state.
Figure 13C:
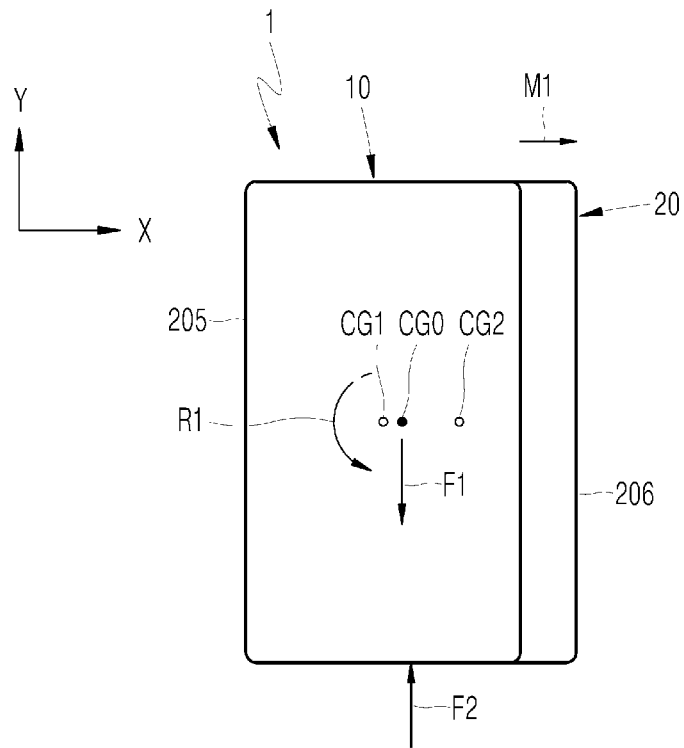
FIG. 13c is a view illustrating the center of gravity and rotation when a second group moves in a first direction.
Figure 13D:
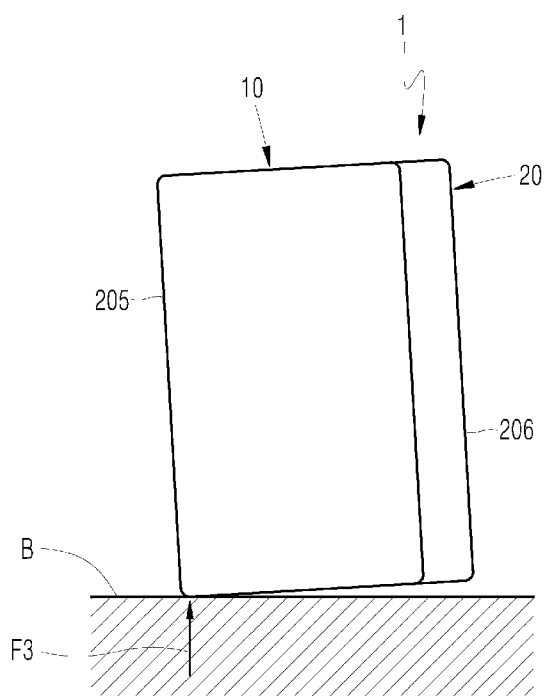
FIG. 13d is a diagram schematically illustrating the moment when a free-falling flexible display device contacts a horizontal floor surface.

FIG. 13*a* is a view illustrating a center of gravity of a flexible display device 1 in the first state, FIG. 13*b* is a view illustrating the center of gravity of a flexible display device 1 in the second state, FIG. 13*c* is a view illustrating the center of gravity and rotation when the second group 20 moves in the first direction, and FIG. 13*d* is a diagram schematically illustrating the moment when a free-falling flexible display device 1 contacts a horizontal floor surface B.

As the second body 200*b* moves relative to the first body 200*a*, the position of the center of gravity of the flexible display device 1 (CG0) may move. This will hereinafter be described.

First, a combination of the first body 200*a* and the components fixed thereto (components that do not move relative to the first body 200*a*) is defined as a first group 10, and a combination of the second body 200*b* and the components fixed thereto (components that do not move relative to the second body 200*b*) is defined as a second group 20. It is assumed that a first center of gravity (CG1), which is the center of gravity of the first group 10, is located at the center of the first group 10, and a second center of gravity (CG2), which is the center of gravity of the second group 20, is located at the center of the second group 20. Although some components constituting the flexible display device 1 may not belong to the first group 10 or the second group 20, these components may be light in weight relative to the weight of the first group 10 and the second group 20. Accordingly, the weight of these components is excluded (disregarded) in the following description.

When the second body 200*b* is in the first position, the width between the first edge portion 205 and the second edge portion 206 is defined as L1, and the distance from the first edge portion 205 to the center of gravity of the flexible display device 1 (CG0) is defined as L2.

In addition, when the second body 200*b* is in the second position, the width between the first edge portion 205 and the second edge portion 206 is defined as L3, and the distance from the first edge portion 205 to the center of gravity of the flexible display device 1 (CG0) is L4.

In one embodiment, the first group 10 may be made to be heavier than the second group 20, and in response to free fall being detected by the first sensor 145, the controller may control the operation of the actuator 500 such that the second body 200*b* (in the first position) and the second group 20 move in the first direction.

For example, the mass of the first group 10 may be three times the mass of the second group 20, or the weight of the first group 10 may be three times the weight of the second group 20. Here, the center of gravity of the flexible display device 1 (CG0) when the second body 200*b* is in the first position may be located at a point between the first center of gravity (CG1) and the second center of gravity (CG2) that is very close to the first center of gravity (CG1) and the second center of gravity (CG2), and the center of gravity of the flexible display device 1 (CG0) when the second body 200*b* is in the second position may be located at a point that is closer to the first center of gravity (CG1) than the second center of gravity (CG2).

That is, L4/L3 may be smaller than L2/L1.

Furthermore, when the second body 200b and the second group 20 move from the first position to the second position (M1) (moving in the first direction), the center of gravity of the flexible display device 1 (CG0) gradually shifts to be biased toward the first body 200a and the first group 10 and away from the second body 200b and the second group 20.

When such a flexible display device 1 is in free fall while the second body 200b and the second group 20 are in the first position (while in the first state), the second body 200b and the second group 20 are moved from the first position to the second position by the first sensor 145, the controller 180, and the actuator 500. When the flexible display device 1 is in free fall, a gravitational force F1 and an air resistance force F2 are applied to the flexible display device 1, and due to these forces, the flexible display device 1 is rotated counter-clockwise (R1) as shown in the drawings (FIG. 13C). Accordingly, when the flexible display device 1 contacts the floor, the first edge portion 205 may contact the floor B before the second edge portion 206, and the impact from the floor B (F3) may be applied to the first edge portion 205 rather than the second edge portion 206.

In the flexible display device 1, the components that are deformed as the flexible display device 1 moves between the first state and the second state (for example, the second region 320, the support bars 370, and the support 400) are formed to be closer to the second edge portion 206 than the first edge portion 205, and by preventing or alleviating impact to the second edge portion 206 directly applied from the floor B, damage to or deformation of these components can be prevented.

Figure 14A:
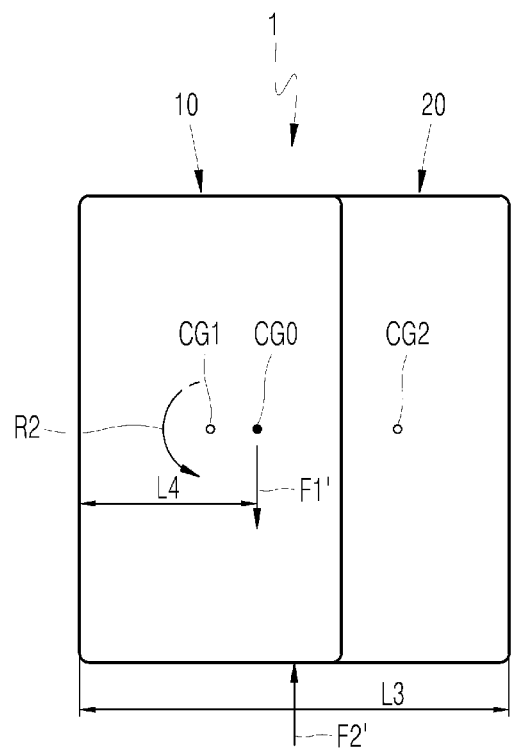
FIG. 14a is a view illustrating the center of gravity and rotation of a flexible display device freely falling while in the second state.
Figure 14B:
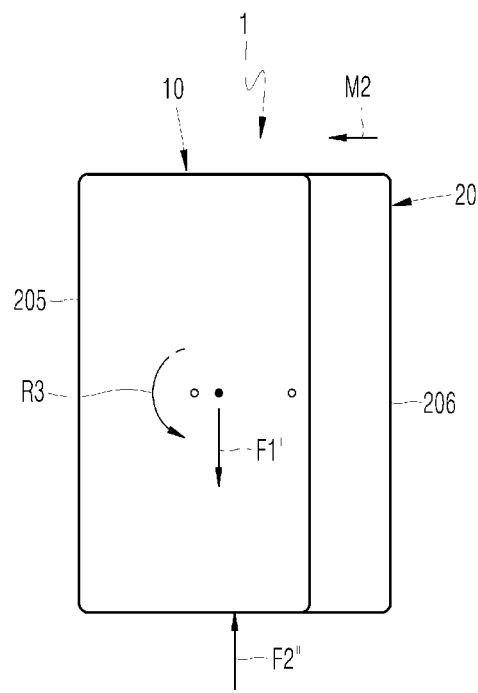
FIG. 14b is a view illustrating the center of gravity and rotation when the second group moves in the opposite direction to the first direction.
Figure 14C:
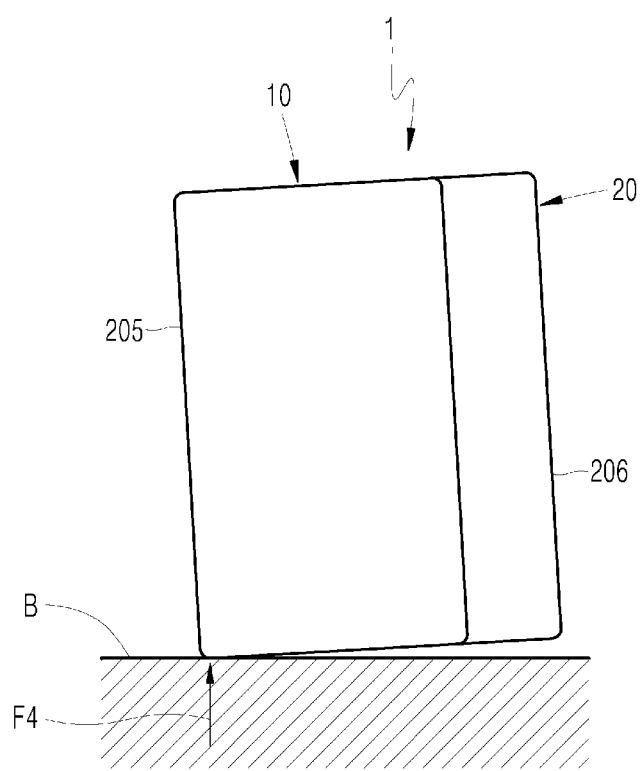
FIG. 14c is a diagram schematically illustrating the moment when a free-falling flexible display device contacts a horizontal floor surface.

FIG. 14a is a view illustrating the center of gravity and rotation of a flexible display device 1 freely falling while in the second state, FIG. 14b is a view illustrating the center of gravity and rotation when the second group 20 moves in the opposite direction to the first direction, and FIG. 14c is a diagram schematically illustrating the moment when a free-falling flexible display device 1 contacts a horizontal floor surface.

In another embodiment, the first group 10 may be made to be heavier than the second group 20, and in response to free fall being detected by the first sensor 145, the controller 180 may control the operation of the actuator 500 such that the second body 200b (in the second position) and the second group 20 move in the opposite direction to the first direction.

When the flexible display device 1 is in free fall while the second body 200b is in the second position, a gravitational force F1 and an air resistance force F2 are applied to the flexible display device 1, and due to these forces, the flexible display device 1 is rotated counter-clockwise (R2) as shown in the drawings (FIG. 14a).

When the second body 200b moves toward the first position from the second position (M2) while the flexible display device 1 is in free fall, a gravitational force F1' and an air resistance force F2" are applied to the flexible display device 1, and due to these forces, the flexible display device 1 is still rotated counter-clockwise (R3) as shown in the drawings (FIG. 14b).

Accordingly, when the flexible display device 1 contacts the floor B, the first edge portion 205 may contact the floor B before the second edge portion 206, and the impact applied from the floor B (F4) may be transmitted more to the first edge portion 205 than the second edge portion 206.

In such a case, the impact applied to the second edge portion 206 from the floor (B) may be alleviated, and damage to or deformation of the components that are deformed as the flexible display device 1 moves between the first state and the second state (for example, the flexible display 300, the support bars 370, and the support 400) can still be prevented.

In addition, when the flexible display device 1 contacts the floor, the second body 200b is in the first position rather than the second position, or is between the second position and the first position. Further, when the second body 200b is in the second position (when the flexible display device 1 is in the second state), the flexible display device 1 may have a relatively more compact structure (shape). Accordingly, the possibility of damage being caused to the flexible display device 1 may be reduced.

As described above, in the present embodiment, the flexible display device 1 may be rotated by causing the second body 200b to move relative to the first body 200a when the flexible display device 1 is in free fall. As a result, when the flexible display device 1 is in free fall, the rotation of the flexible display device 1 can be controlled, and position control of the flexible display device 1 can be performed.

Figure 15A:
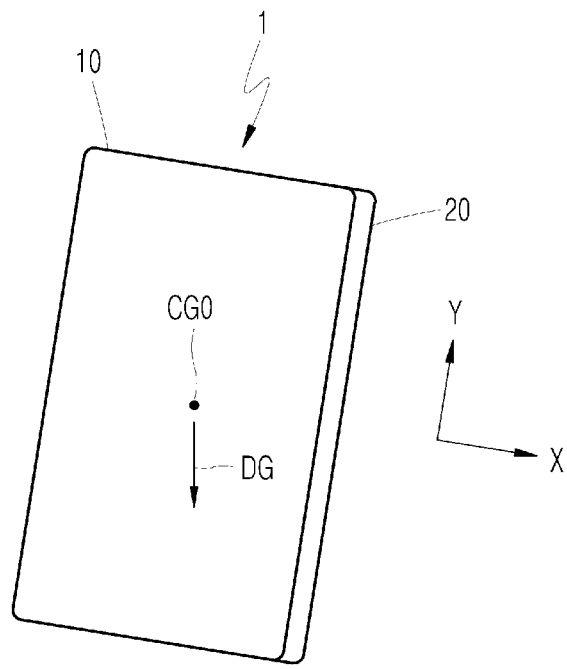
FIG. 15a is a diagram schematically illustrating a state in which the first direction of a flexible display device in the first state is inclined downward.
Figure 15B:
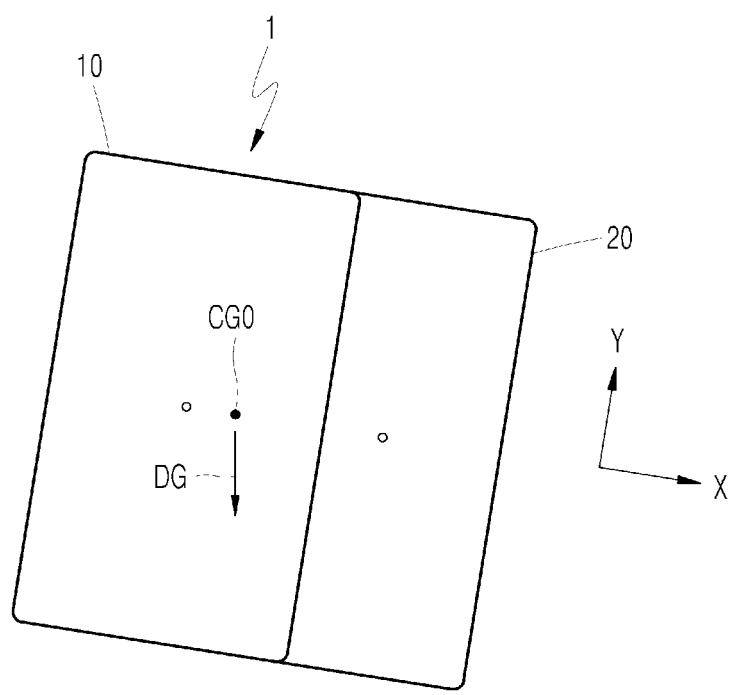
FIG. 15b is a diagram schematically illustrating a state in which the first direction of a flexible display device in the second state is inclined downward.

FIG. 15a is a diagram schematically illustrating a state in which the first direction of a flexible display device 1 in the first state is inclined downward, and FIG. 15b is a diagram schematically illustrating a state in which the first direction of a flexible display device 1 in the second state is inclined downward.

Figure 16A:
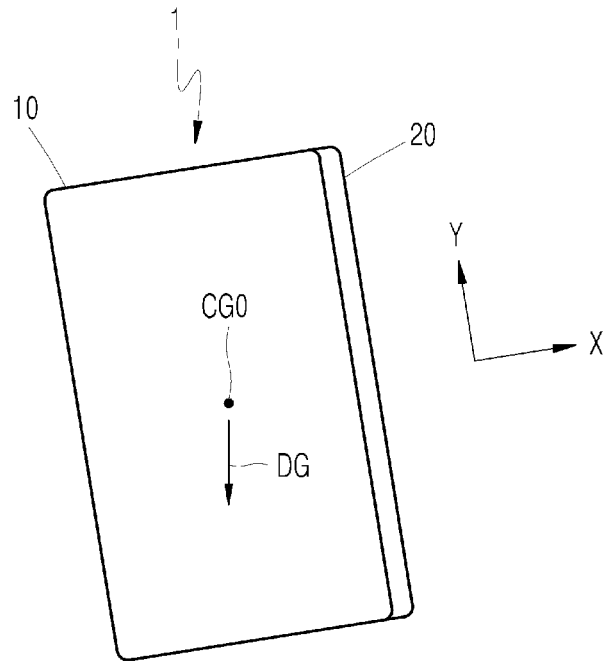
FIG. 16a is a diagram schematically illustrating a state in which the first direction of a flexible display device in the first state is inclined upward.
Figure 16B:
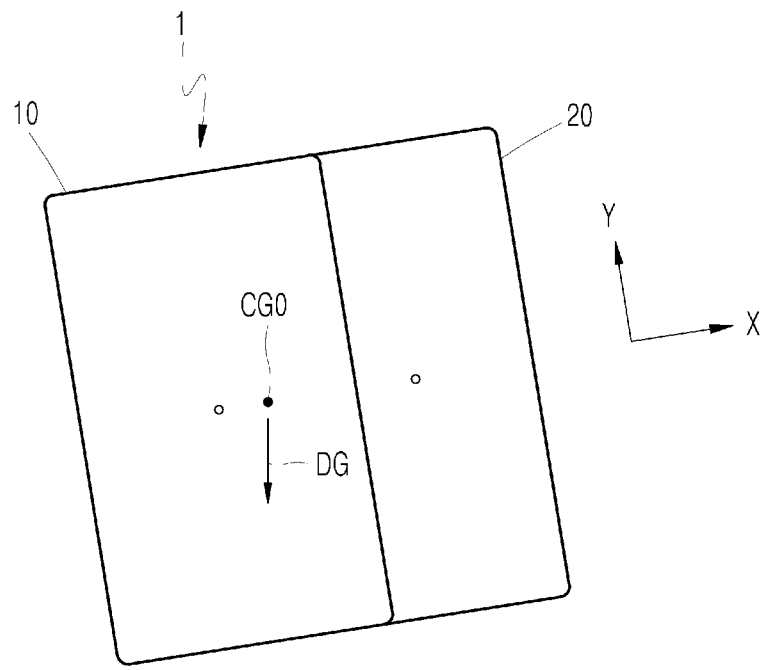
FIG. 16b is a diagram schematically illustrating a state in which the first direction of a flexible display device in the second state is inclined upward.

FIG. 16a is a diagram schematically illustrating a state in which the first direction of a flexible display device 1 in the first state is inclined upward, and FIG. 16b is a diagram schematically illustrating a state in which the first direction of a flexible display device 1 in the second state is inclined upward.

The first sensor 145 may be configured to sense an inclination of the flexible display device 1. For example, when the first sensor 145 includes a gyro sensor, the first sensor 145 may sense, for example, an inclined direction and an inclined degree (angle) of the flexible display device 1.

During use, the flexible display device 1 may be inclined to either side. For example, the flexible display device 1 may be in an inclined state in which a front side of the flexible display device 1 in the first direction faces downward (a first inclined state) (see FIGS. 15a and 15b).

In another case, the flexible display device 1 may be in an inclined state in which the front side of the flexible display device 1 in the first direction faces upward (second inclined state)(see FIGS. 16a and 16b).

In embodiments of the present disclosure, the actuator 500 may be configured to operate in response to the flexible display device 1 being in free fall while in the first inclined state.

In one embodiment, in response to free fall being detected by the first sensor 145 while the flexible display device 1 is in the first state and in the first inclined state (see FIG. 15a), the controller may cause the actuator 500 to operate, and accordingly the second body 200b may be moved in the first direction.

In another embodiment, in response to free fall being detected by the first sensor 145 while the flexible display device 1 is in the second state and in the first inclined state (see FIG. 15b), the controller may cause the actuator 500 to operate, and accordingly the second body 200b may be moved in the opposite direction to the first direction.

Further, in the embodiments of the present disclosure, the actuator 500 may be configured to operate in response to the flexible display device 1 being in free fall while in the second inclined state.

In one embodiment, even when free fall is detected by the first sensor 145 while the flexible display device 1 is in the first state and in the second inclined state (see FIG. 16a), the controller may not cause the actuator 500 to operate, and accordingly the second body 200b may not be moved in the first direction relative to the first body 200a.

In another embodiment, in response to free fall being detected by the first sensor 145 while the flexible display device 1 is in the second state and in the second inclined state (see FIG. 16b), the controller may cause the actuator 500 to operate, and accordingly the second body 200b may be moved in the opposite direction to the first direction.

Figure 17:
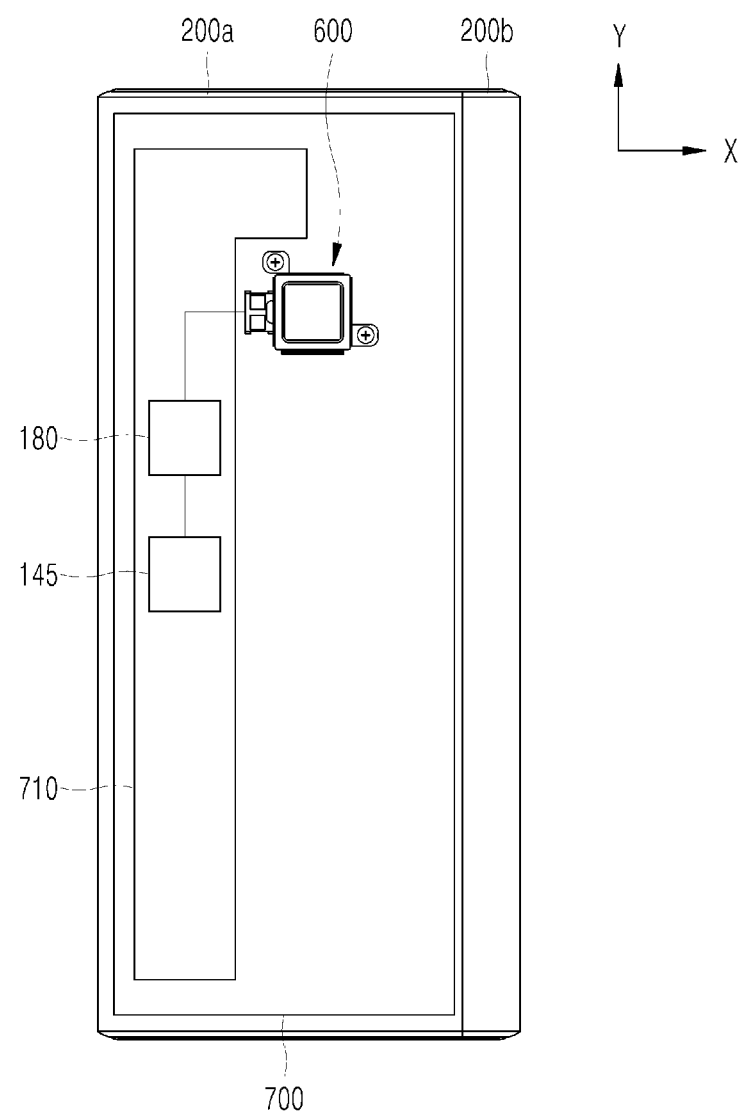
FIG. 17 is a view schematically illustrating a coupling and connection relationship of some components provided in the flexible display device.

FIG. 17 is a view schematically illustrating a coupling and connection relationship of some components provided in the flexible display device 1.

Figure 18:
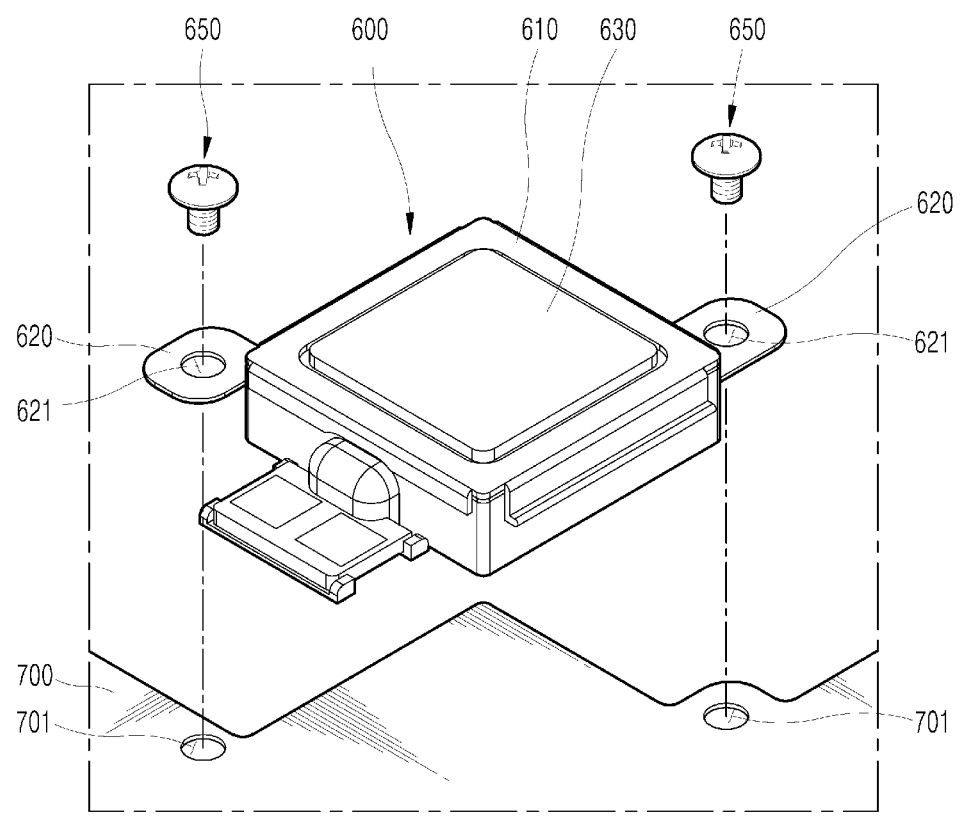
FIG. 18 is a perspective view illustrating a state in which a vibration generator is separated from a fixing frame.

FIG. 18 is a perspective view illustrating a state in which a vibration generator 600 is separated from a fixing frame 700.

Figure 19A:
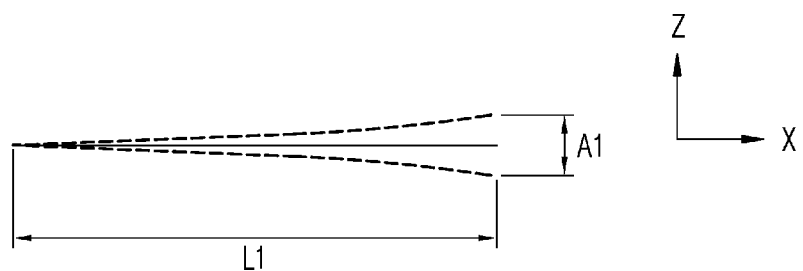
FIGS. 19a and 19b are diagrams illustrating a width of the flexible display device and displacement (amplitude) due to vibration.
Figure 19B:
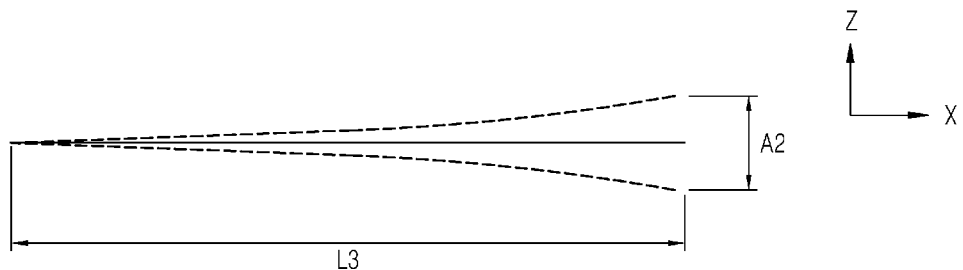

FIGS. 19a and 19b are diagrams illustrating a width of the flexible display device 1 and displacement (amplitude) due to vibration. FIG. 19a schematically illustrates an example of a deformed shape (dotted lines) and displacement A1, according to vibration, of a flexible display device (solid lines) having a length (width) of L1. FIG. 19b schematically illustrates an example of a deformed shape (dotted lines) and a displacement A2, according to vibration, of a flexible display device (solid lines) having a length (width) of L3.

The flexible display device 1 may further include a vibration generator 600 coupled to the first body 200a.

The vibration generator 600 is configured to generate vibration, and the vibration of the vibration generator 600 is transmitted to the flexible display device 1.

The vibration generator 600 may be configured as a vibration motor. The vibration generator 600 may be configured as an eccentric rotating mass motor, a linear resonant actuator, or a piezoelectric actuator.

The vibration generator 600 may include a case 610 and a fixing bracket 620.

The case 610 forms the exterior of the vibrator 600. The case 610 may be made of a metal, such as stainless steel. A rotating body having an eccentric mass may be provided inside the case 610, and vibration may be generated in the vibration generator 600 while the rotating body rotates about a rotational axis.

The fixing bracket 620 extends from the case 610. The fixing bracket 620 may be made of a metal, such as stainless steel. The fixing bracket 620 may be integrally formed with the case 610, or may be coupled to the case 610 by welding, for example.

Two or more fixing brackets 620 may be provided. The two or more fixing brackets 620 may be formed on opposite sides of the case 610 from each other. For example, two fixing brackets 620 may be respectively formed at opposite edges of the case 610.

The vibration generator 600 may be fixed to the fixing frame 700 of the first body 200a by fixing screws 650. Each fixing screw 650 may be screwed to the fixing frame 700 while passing through a first fixing hole 621 in the fixing bracket 620 and a second fixing hole 701 in the fixing frame 700.

A pad 630 may be formed on the upper surface of the vibration generator 600. The pad 630 may be fixed to the upper surface of the case 610. The pad 630 may be made of a soft material, such as a sponge. The pad 630 may prevent vibration of the vibration generator 600 from being transmitted in an undesired direction.

By being configured as described above, the vibration generator 600 can be firmly coupled to the fixing frame 700 and the first body 200a, and the vibration generated by the vibration generator 600 can be stably transmitted to the entirety of the first body 200a and the flexible display device 1.

The vibration generator 600 is connected to the controller 180, and the controller 180 controls the operation of the vibration generator 600. That is, the vibration generator 600 may be operated or stopped by the controller 180.

In one embodiment, in the flexible display device 1, the vibration generator 600 may be configured to operate in response to free fall being detected by the first sensor 145. That is, the controller 180 may cause the vibration generator 600 to operate only under the condition of free fall.

In response to free fall being detected by the first sensor 145, the controller 180 may enable the actuator 500 and the vibration generator 600 to be operated together. In particular, the deformation from the first position (first state) to the second position (second state) and the operation of the vibration generator 600 may be performed together.

When deformation from the first position (first state) to the second position (second state) is made, the width between the first edge portion 205 and the second edge portion 206 increases. That is, the overall width (a second width) of the flexible display device 1 when the second body 200b is in the second position (second state) is greater than the overall width (a first width) of the flexible display device 1 when the second body 200b is in the first position (first state). In this state (process), the operation of the vibration generator 600 may cause an increase in the displacement of the flexible display device 1 according to vibration.

If the maximum displacement of the flexible display device 1 according to vibration when vibration occurs while the flexible display device 1 in the first state is in free fall is referred to as a first displacement, and the maximum displacement of the flexible display device 1 according to vibration when vibration occurs while the flexible display device 1 in the second state is in free fall is referred to as a second displacement, since the second width is greater than the first width, the second displacement may be greater than the first displacement.

Referring to FIGS. 13a and 13b, the second width L3, which is the overall width of the flexible display device 1 when the second body 200b is in the second position (second state), is greater than the first width L1, which is the overall width of the flexible display device 1 when the second body 200b is in the first position (first state). As illustrated in FIGS. 19a and 19b, when the flexible display device 1 vibrates in the third direction (Z direction), the displacement (amplitude A2) in the case of the second width L3 may be greater than the displacement (amplitude A1) in the case of the first width L1. In this way, the second displacement of the flexible display device 1 according to vibration when the second body 200b is in the second position (second state) is greater than the first displacement of the flexible display device 1 according to vibration when the second body 200b is in the first position (first state). The difference in displacement may occur in several directions.

Accordingly, when the flexible display device 1 in the first state is in free fall, and the flexible display device 1 is vibrated while being deformed to the second state, the amount of rotation and displacement of the flexible display device 1 can be increased.

In the flexible display device 1, the vibration generator 600 may be configured to operate in response to the flexible display device 1 being in free fall while in the first inclined state. Here, the controller 180 may enable the actuator 500 and the vibration generator 600 to be operated together In one embodiment, when the flexible display device 1 is in free fall while in the first state and in the first inclined state, the actuator 500 and the vibration generator 600 may operate together.

Table 1 below shows the results of a simulation regarding the amount of rotation (rotation angle) of a free-falling flexible display device 1 before contacting the ground, in which the flexible display device 1 freely falls from a position in the air (1 m above the ground) such that the third direction is parallel to the ground and the first direction is parallel to the ground (see 'Initial angle: 0°' in Table 1).

In addition, Table 1 also shows the results of a simulation regarding the amount of rotation (rotation angle) of a free-falling flexible display device 1 before contacting the ground, in which the flexible display device 1 freely falls from a position in the air (1 m above the ground) such that the third direction is parallel to the ground and the first direction is inclined downward by 45 degrees (see 'Initial angle: 45°' in Table 1).

TABLE 1

| | Initial angle: 0° | | | Initial angle: 45° | | |
|---|---|---|---|---|---|---|
| | First state | Moved in first direction | Difference | First state | Moved in first direction | Difference |
| X | −0.18° | 0° | 0.18° | −0.14° | 0.02° | 0.16° |
| Y | −0.99° | 0.36° | 1.35° | −0.98° | −0.32° | 0.66° |
| Z | −0.35° | 0.33° | 0.68° | −0.27° | −3.92° | −3.65° |

In the case of the initial angle of 0° (degrees) when the flexible display device freely falls while remaining in the first state, the amount of rotation based on the Z-axis is −0.35°, whereas in the case of the initial angle of 0° when the flexible display device freely falls while being deformed to the second state (while the second body is moved to the second position), the amount of rotation based on the Z-axis is 0.33°. As such, it can be seen that the flexible display device in the latter case further rotates counterclockwise by about 0.68°.

In the case of the initial angle of 45° when the flexible display device freely falls while remaining in the first state, the amount of rotation based on the Z-axis is −0.27°, and in the case of the initial angle of 45° when the flexible display device freely falls while being deformed to the second state (while the second body is moved to the second position), the amount of rotation based on the Z-axis is −3.92°. As such, it can be seen that the flexible display device in the latter case further rotates clockwise by about 3.65°. When the flexible display device is in free fall, the flexible display device also rotates based on the X-axis and the Y-axis, in addition to the Z-axis, and the amount of rotation (rotation angle) of the flexible display device for each initial angle/ each axis is different. The impact or damage to the flexible display may vary according to each different amount of rotation (rotation angle).

Information on an amount of rotation (rotation angle) for each initial angle/each axis (first rotation angle information), obtained through simulation or experiment, may be stored in the memory 170. In addition, based on the first rotation angle information stored in the memory 170, information on an amount of rotation (rotation angle) in a specific situation (second rotation angle information) may be predicted or calculated by the controller 180.

When the flexible display device is in free fall, the first sensor 145 may sense information on the inclination of the flexible display device (inclined direction and angle), and based on the information on the inclination and on the first rotation angle information or the second rotation angle information, the controller 180 may cause the actuator to operate or not to operate.

In the flexible display device as described above, the second body may be moved by the actuator in response to free fall being detected by the first sensor, and accordingly, the position of the flexible display device can be controlled, and an expected impact or damage to the flexible display device when in free fall can be reduced.

While specific exemplary embodiments of the present disclosure have been described above and illustrated, it will be understood by those skilled in the art that the present disclosure is not limited to the described exemplary embodiments, and various changes and modifications may be made to the present disclosure without departing from the spirit and the scope of the present disclosure. Therefore, the scope of the present disclosure is not limited to the above-described exemplary embodiments, but shall be defined by the technical thought as recited in the following claims.

INDUSTRIAL APPLICABILITY

The flexible display device according to embodiments of the present disclosure has high industrial applicability, in that when in free fall, the flexible display device can be rotated while the second body is moved, thereby reducing damage to the flexible display device due to impact with the ground.

What is claimed is:

1. A flexible display device, comprising:
   a first body;
   a second body configured to move relative to the first body between a first position and a second position;
   a flexible display comprising a first region fixed to the first body, a first connected region extending from the first region, and a second connected region extending from the first connected region, wherein when the second body is in the first position, the first connected region is curved at an edge of the flexible display device and a plane of the second connected region is parallel to a plane of the first region, and wherein when the second body is in the second position, the first connected region is coplanar with the first region and a portion of the second connected region is curved at the edge of the flexible display device;
   an actuator configured to provide power for moving the second body with respect to the first body; and
   a first sensor configured to detect free fall of the flexible display device,
   wherein the second body is moved to the second position by operation of the actuator in response to detection of free fall of the flexible display device by the first sensor.

2. The flexible display device of claim 1, further comprising:
a controller configured to control operation of the actuator; and
a battery coupled to the first body.

3. The flexible display device of claim 1, wherein as the second body is moved from the first position to the second position, a center of gravity of the flexible display device is shifted toward the first body and away from the second body.

4. The flexible display device of claim 1,
wherein the first body comprises a first edge portion forming one edge of the flexible display device,
wherein the second body comprises a second edge portion forming another edge of the flexible display device opposite the one edge,
wherein a width between the first edge portion and the second edge portion when the second body is in the first position is defined as L1, a distance from the first edge portion to a first center of gravity of the flexible display device when the second body is in the first position is defined as L2, a width between the first edge portion and the second edge portion when the second body is in the second position is defined as L3, and a distance from the first edge portion to a second center of gravity of the flexible display device when the second body is in the second position is defined as L4, and
wherein a ratio defined as L4/L3 is smaller than a ratio defined as L2/L1.

5. The flexible display device of claim 1,
wherein the first sensor is configured to detect an inclined direction of the flexible display device, and
wherein the flexible display device further comprises a controller configured to cause the actuator to operate in response to detection of free fall of the flexible display device while in a first inclined state in which a first side of the flexible display device is inclined downward.

6. The flexible display device of claim 1, further comprising a vibration generator coupled to the first body and configured to generate vibration in response to detection of free fall of the flexible display device by the first sensor.

7. The flexible display device of claim 6,
wherein the vibration generator comprises:
a case; and
two or more fixing brackets extending from the case,
wherein the flexible display device further comprises:
a fixing frame forming at least a portion of the first body, wherein the actuator is fixed to the fixing frame; and
two or more fixing screws configured to fasten the two or more fixing brackets to the fixing frame.

8. The flexible display device of claim 1, further comprising a plurality of elongated support bars orthogonal to a movement direction of the second body and coupled to inner surfaces of the first connected region and the second connected region.

9. The flexible display device of claim 8,
wherein each of the plurality of support bars comprises:
a first support slider at one end of the support bar;
a second support slider at another end of the support bar opposite the one end; and
a connection arm configured to connect the first support slider and the second support slider and to support the inner surface of the first connected region or the second connected region, and
wherein the second body comprises:
a first movement guide groove forming a path and configured to accommodate movement of the first support slider therethrough; and
a second movement guide groove forming a path and configured to accommodate movement of the second support slider therethrough.

10. A flexible display device, comprising:
a first body;
a second body coupled to the first body so as to be movable relative to the first body in a first direction, the second body comprising a support formed along a second direction orthogonal to the first direction;
a flexible display comprising a first region coupled to the first body, and a second region extending from the first region, wherein a portion of the second region is curved around the support;
an actuator comprising a driving motor coupled to the first body and a driving gear configured to be rotated by the driving motor;
a rack coupled to the second body and comprising a rack gear engaged with the driving gear; and
a first sensor configured to detect free fall of the flexible display device,
wherein the second body is moved in the first direction or an opposite direction to the first direction by operation of the actuator in response to detection of free fall of the flexible display device by the first sensor.

11. The flexible display device of claim 10,
wherein when the second body is moved in the first direction by operation of the actuator, a center of gravity of the flexible display device shifts toward the first body and away from the second body, and
wherein the actuator is configured to operate such that the second body is moved in the first direction in response to detection of free fall of the flexible display device by the first sensor.

12. The flexible display device of claim 10,
wherein the combination of the first body and the components fixed thereto (a first group) is heavier than the combination of the second body and the components fixed thereto (a second group), and
wherein the actuator is configured to operate such that the second body is moved in the direction opposite to the first direction in response to detection of free fall of the flexible display device by the first sensor.

13. The flexible display device of claim 10,
wherein the first body comprises a first edge portion forming a first edge of the flexible display device, the first edge portion located further outward than a corresponding edge of the flexible display, and
wherein the second body comprises a second edge portion disposed at an outer side of the support, the second edge portion forming a second edge of the flexible display device opposite the first edge.

14. The flexible display device of claim 13,
wherein the second body is configured to move relative to the first body between a first position and a second position, wherein the second body moves in the first direction when moving from the first position to the second position,
wherein a width between the first edge portion and the second edge portion when the second body is in the first position is defined as L1, a distance from the first edge portion to a first center of gravity of the flexible display device when the second body is in the first position is defined as L2, a width between the first edge portion and the second edge portion when the second body is in the second position is defined as L3, and a distance from the first edge portion to a second center of gravity of the flexible display device when the second body is in the second position is defined as L4, wherein a ratio defined as L4/L3 is smaller than a ratio defined as L2/L1, and wherein the second body is moved in the first direction by operation of the actuator in response to detection of free fall of the flexible display device by the first sensor.

15. The flexible display device of claim 10, wherein the first sensor is configured to detect an inclined direction of the flexible display device, and wherein the flexible display device further comprises a controller configured to cause the actuator to operate in response to detection of free fall of the flexible display device while in a first inclined state in which a first side of the flexible display device is inclined downward.

16. The flexible display device of claim 15, further comprising a vibration generator coupled to the first body, wherein the controller is further configured to cause the vibration generator to generate vibration in response to detection of free fall of the flexible display device while in the first inclined state.

17. The flexible display device of claim 16, wherein the vibration generator comprises:

a case; and two or more fixing brackets extending from the case, wherein the flexible display device further comprises:

a fixing frame forming at least a portion of the first body, wherein the actuator is fixed to the fixing frame; and two or more fixing screws configured to fasten the two or more fixing brackets to the fixing frame.

18. The flexible display device of claim 10, wherein the support comprises a roller rotatable about a rotational axis along the second direction.

19. The flexible display device of claim 10, further comprising a plurality of elongated support bars parallel to the second direction and coupled to an inner surface of the second region.

20. The flexible display device of claim 19, wherein each of the plurality of support bars comprises:

a first support slider at one end of the support bar;

a second support slider at another end of the support bar opposite to the one end; and a connection arm configured to connect the first support slider and the second support slider and to support the inner surface of the second region, and wherein the second body comprises:

a first movement guide groove forming a path and configured to accommodate movement of the first support slider therethrough; and a second movement guide groove forming a path and configured to accommodate movement of the second support slider therethrough.

* * * * *